US009618970B2

(12) United States Patent
Lee et al.

(10) Patent No.: US 9,618,970 B2
(45) Date of Patent: Apr. 11, 2017

(54) MOBILE TERMINAL AND CONTROLLING METHOD THEREOF

(71) Applicant: LG Electronics Inc., Seoul (KR)

(72) Inventors: Seojin Lee, Seoul (KR); Samsick Kim, Seoul (KR); Donghwan Yu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/749,511

(22) Filed: Jun. 24, 2015

(65) Prior Publication Data

US 2016/0085266 A1 Mar. 24, 2016

(30) Foreign Application Priority Data

Sep. 19, 2014 (KR) ........................ 10-2014-0125114

(51) Int. Cl.
| | |
|---|---|
| *H04N 5/232* | (2006.01) |
| *G06F 1/16* | (2006.01) |
| *G06F 3/00* | (2006.01) |
| *G06F 3/01* | (2006.01) |
| *G06F 3/14* | (2006.01) |

(Continued)

(52) U.S. Cl.
CPC ............ *G06F 1/163* (2013.01); *G06F 1/1694* (2013.01); *G06F 3/005* (2013.01); *G06F 3/017* (2013.01); *G06F 3/1454* (2013.01); *H04N 5/23203* (2013.01); *H04N 5/23206* (2013.01); *H04N 5/23293* (2013.01); *H04N 5/2628* (2013.01);
(Continued)

(58) Field of Classification Search
CPC ........ G06F 1/163; G06F 3/005; G06F 3/1454; G06F 1/1694; G06F 3/017; G06F 2203/04102; H04N 5/335; H04N 5/2628; H04N 5/23206; H04N 5/23203; H04N 5/23293
USPC .......... 348/240.2, 211.99, 211.1–211.4, 211.8
See application file for complete search history.

(56) References Cited

U.S. PATENT DOCUMENTS

| | | | |
|---|---|---|---|
| 9,344,615 B1 * | 5/2016 | Bostick .............. | H04N 5/23203 |
| 2010/0214321 A1 | 8/2010 | Hokkanen et al. | |

(Continued)

FOREIGN PATENT DOCUMENTS

| | | |
|---|---|---|
| CN | 103576902 | 2/2014 |
| WO | 97/27704 | 7/1997 |

OTHER PUBLICATIONS

Love, "How to Take a Picture With Your Pebble Smart Watch," PebbleCam—Business Insider, XP055242796, Nov. 2013, 1 page.

(Continued)

*Primary Examiner* — Sinh Tran
*Assistant Examiner* — Zhenzhen Wu
(74) *Attorney, Agent, or Firm* — Lee, Hong, Degerman, Kang & Waimey

(57) ABSTRACT

Disclosed are a mobile terminal of a watch type and controlling method thereof, by which a photographing device can be remotely controlled. The present invention includes a wireless communication unit configured to communicate with a photographing device, a display unit configured to display a preview image inputted through a camera of the photographing device before a photo is photographed through the photographing device, and a controller, if a preset user input is received while the preview image is outputted, controlling a remote photograph command to be transmitted to enable the photo to be photographed through the photographing device.

14 Claims, 22 Drawing Sheets

(51) Int. Cl.
*H04N 5/262* (2006.01)
*H04N 5/335* (2011.01)

(52) U.S. Cl.
CPC ... *H04N 5/335* (2013.01); *G06F 2203/04102* (2013.01)

(56) References Cited

U.S. PATENT DOCUMENTS

| | | | | |
|---|---|---|---|---|
| 2014/0139637 A1* | 5/2014 | Mistry | ................ | H04N 5/2252 348/46 |
| 2014/0267742 A1 | 9/2014 | Tapia et al. | | |
| 2014/0282059 A1* | 9/2014 | Oh | ................ | G06F 1/1641 715/744 |
| 2015/0015741 A1* | 1/2015 | Kim | ................ | H04N 5/23293 348/239 |
| 2015/0074797 A1* | 3/2015 | Choi | ................ | G06F 21/32 726/19 |
| 2015/0220154 A1* | 8/2015 | Midholt | ................ | G06F 3/014 345/156 |
| 2015/0227245 A1* | 8/2015 | Inagaki | ................ | G06F 3/0412 345/173 |
| 2015/0324001 A1* | 11/2015 | Yanai | ................ | G06F 3/0304 345/156 |
| 2016/0021291 A1* | 1/2016 | Freund | ................ | H04N 5/23203 348/211.2 |
| 2016/0037055 A1* | 2/2016 | Waddington | ................ | H04N 5/23206 348/211.8 |
| 2016/0065831 A1* | 3/2016 | Howard | ................ | H04N 5/23293 348/211.2 |

OTHER PUBLICATIONS

European Patent Office Application U.S. Appl. No. 151853603, Search Report dated Jan. 28, 2016, 9 pages.

* cited by examiner

FIG. 4
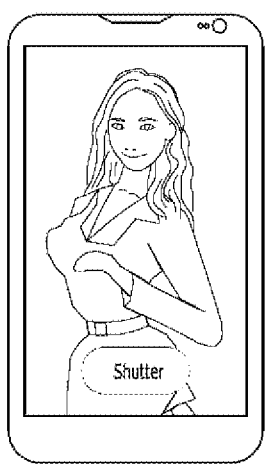
Photographing device
Preview image
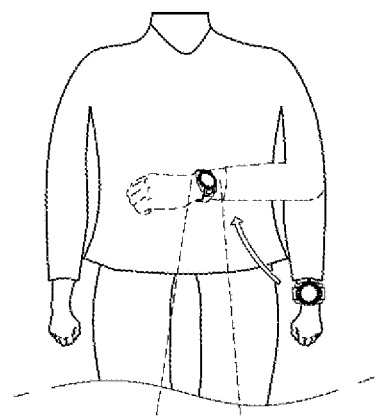
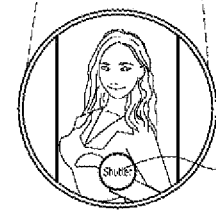
412
Preview image display

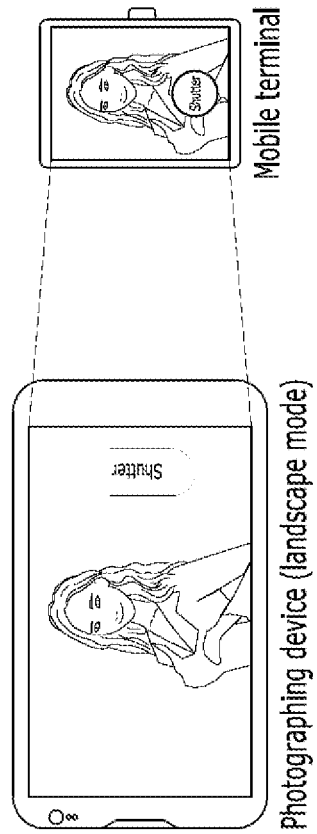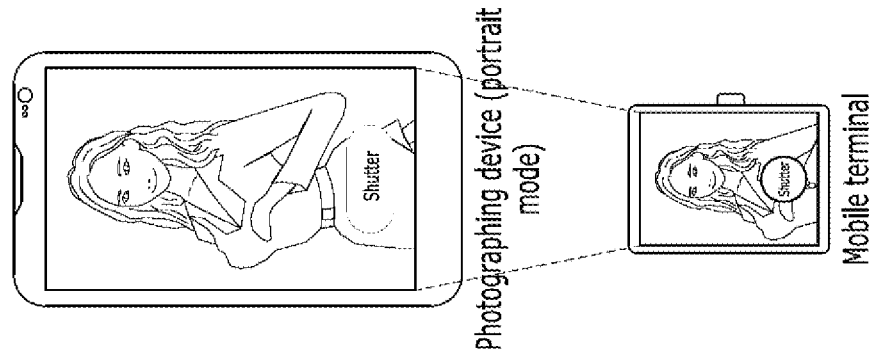

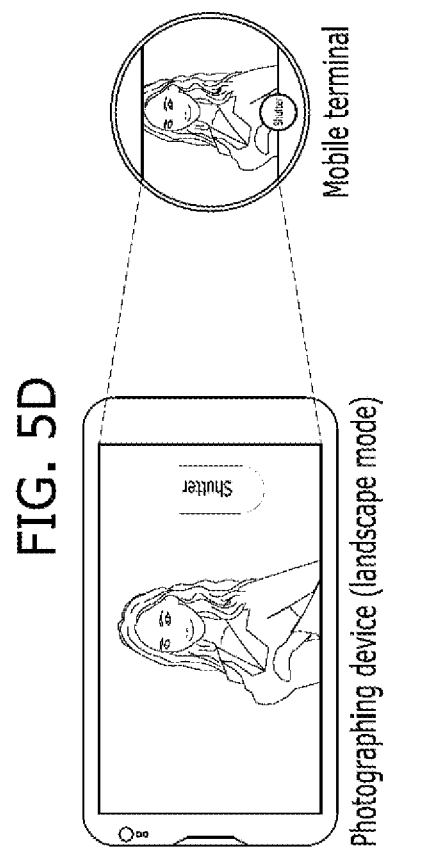
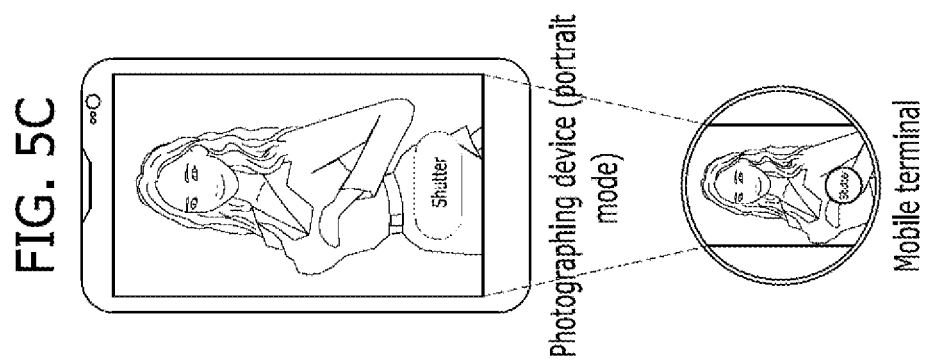
FIG. 5C
FIG. 5D

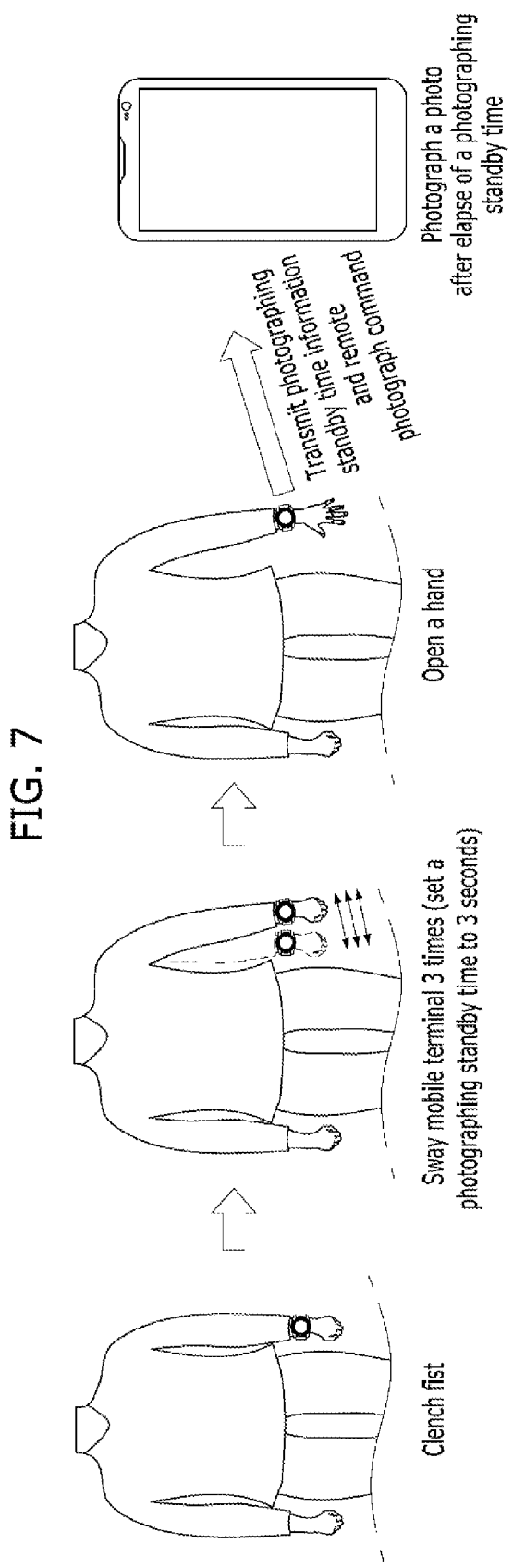

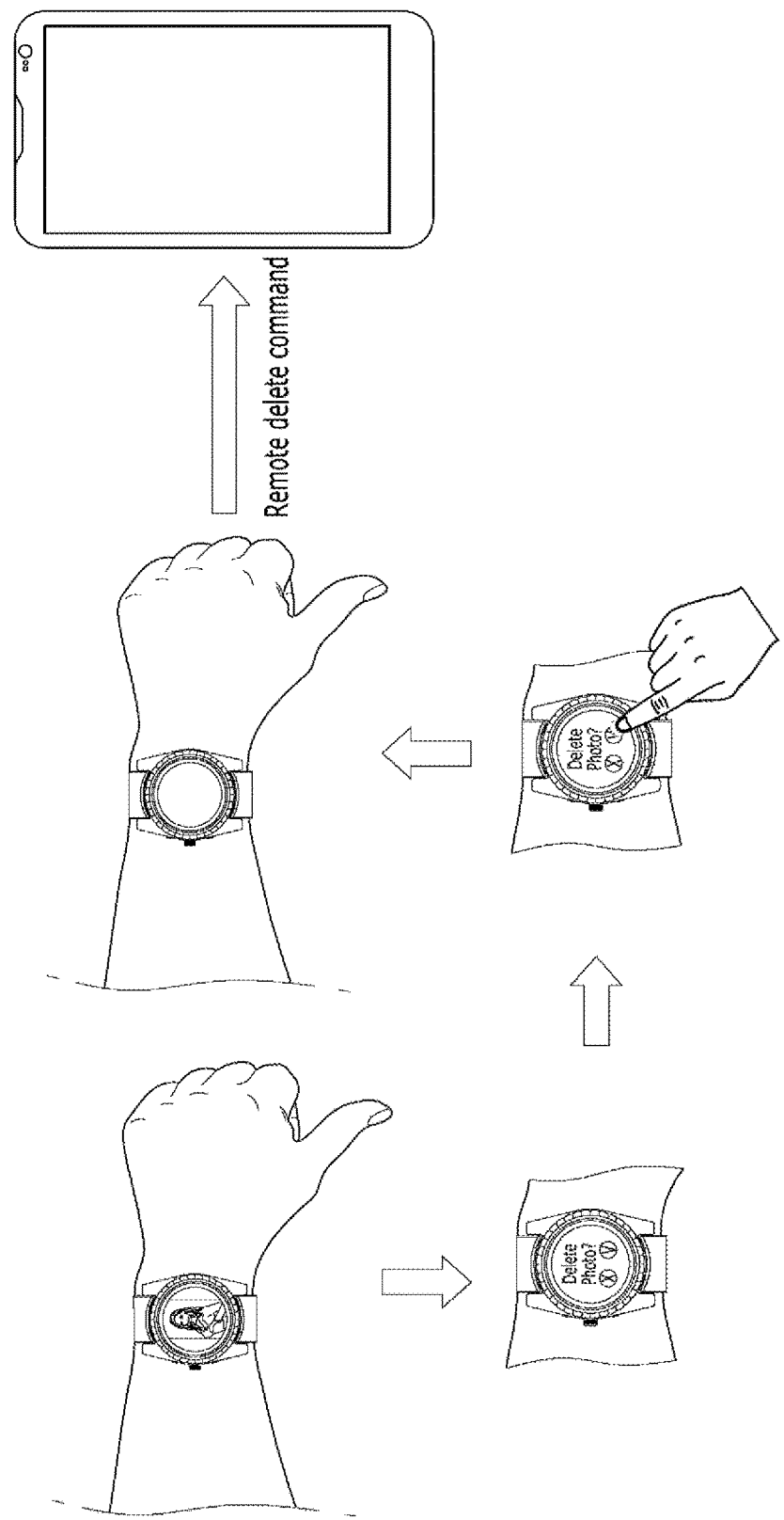

Communication Group

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2014-0125114, filed on Sep. 19, 2014, the contents of which are all hereby incorporated by reference herein in its entirety.

BACKGROUND OF THE INVENTION

Field of the Invention

The present invention relates to a mobile terminal, and more particularly, to a mobile terminal of a watch type and controlling method thereof. Although the present invention is suitable for a wide scope of applications, it is particularly suitable for remotely controlling a photographing device Discussion of the Related Art Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive multicast signals which permit viewing of content such as videos and television programs.

As functions of the terminal are getting diversified, the terminal tends to be implemented as a multimedia player provided with complex functions such as photographing of photos or videos, playback of music or video files, game play, broadcast reception and the like for example.

To further increase the portability of a mobile terminal, many ongoing efforts are made to research and develop a mobile terminal of a type wearable on a wrist like a watch. Unlike traditional mobile terminals, a mobile terminal of a wearable type is advantageous in being carried by a user all the time. Accordingly, methods of aggressively utilizing a mobile terminal of a wearable type are currently discussed. One of the currently discussed methods is a method of remotely controlling a different terminal through a wearable device.

In the following description, the present invention intends to discuss a method of remotely controlling a photographing device through a watch type mobile terminal.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a watch type mobile terminal and controlling method thereof, by which a photographing device can be controlled remotely.

Another object of the present invention is to provide a watch type mobile terminal and controlling method thereof, by which a photo photographed through a photographing device can be shared with another terminal.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal of a watch type according to one embodiment of the present invention may include a wireless communication unit configured to communicate with a photographing device, a display unit configured to display a preview image inputted through a camera of the photographing device before a photo is photographed through the photographing device, and a controller, if a preset user input is received while the preview image is outputted, controlling a remote photograph command to be transmitted to enable the photo to be photographed through the photographing device.

In another aspect of the present invention, a method of controlling a mobile terminal of a watch type according to another embodiment of the present invention may include the steps of receiving preview image data from a photographing device, displaying the preview image data by decoding the preview image data, and if a preset user input is received while the preview image is outputted, transmitting a remote photograph command to the photographing device in order for a photo to be photographed through the photographing device.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 4 is a diagram for one example of outputting a preview image in response to a gesture input according to one embodiment of the present invention;

FIGS. 5A, 5B, 5C and 5D are diagrams for examples of outputting a preview image according to one embodiment of the present invention;

FIG. 7 is a diagram for one example of controlling a photographing device remotely according to one embodiment of the present invention;

FIGS. 9A and 9B are diagrams for examples of operating a photographing device in response to a remote save command or a remote delete command according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
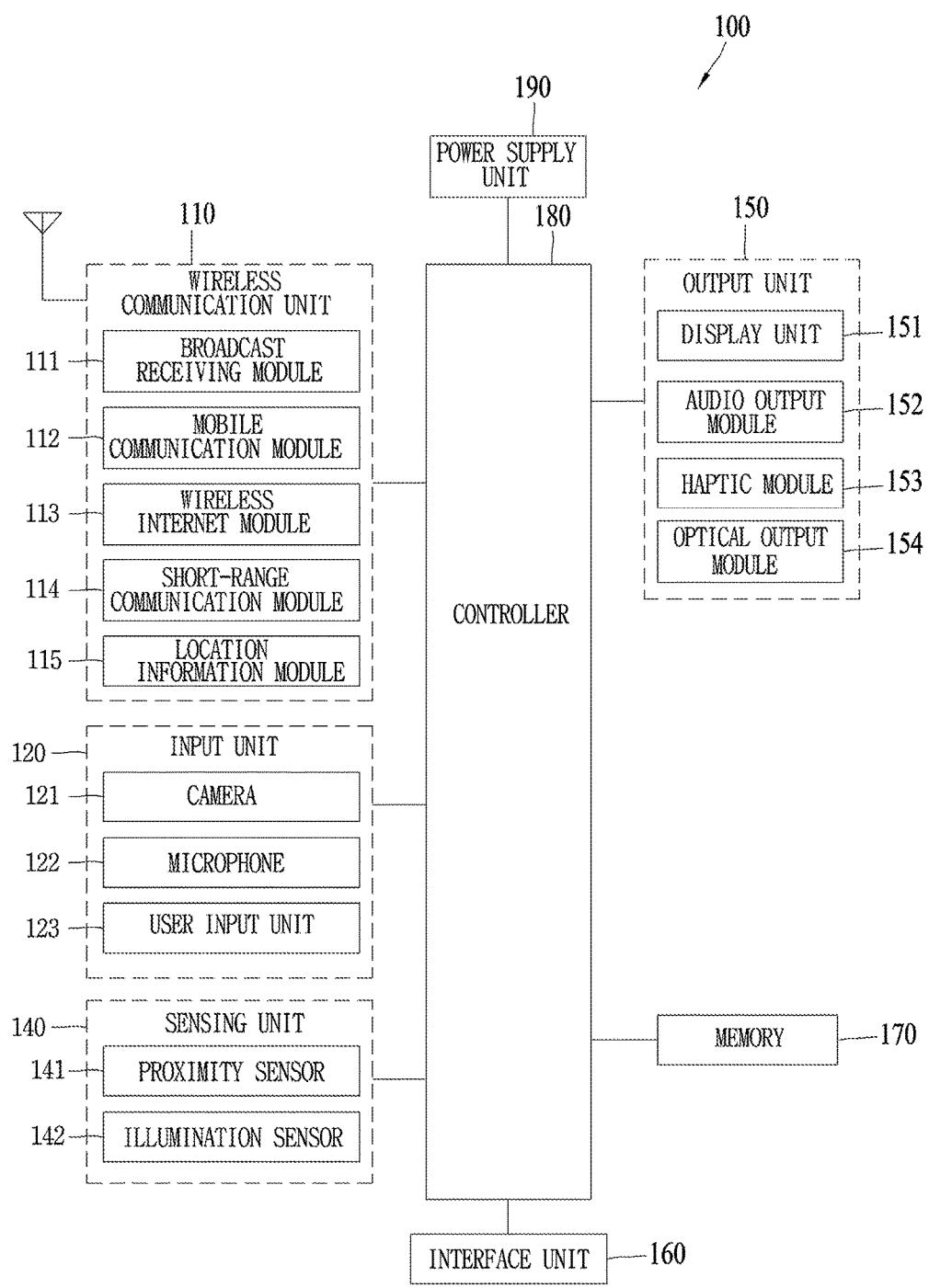
FIG. 1A is a block diagram of a mobile terminal in accordance with the present disclosure.
Figure 1B:
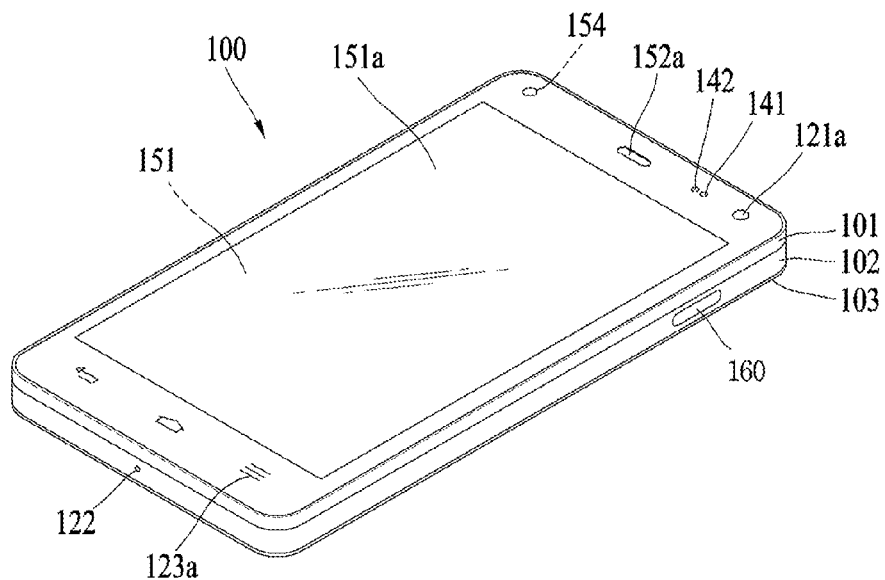
FIGS. 1B and 1C are conceptual views of one example of the mobile terminal, viewed from different directions.
Figure 1C:
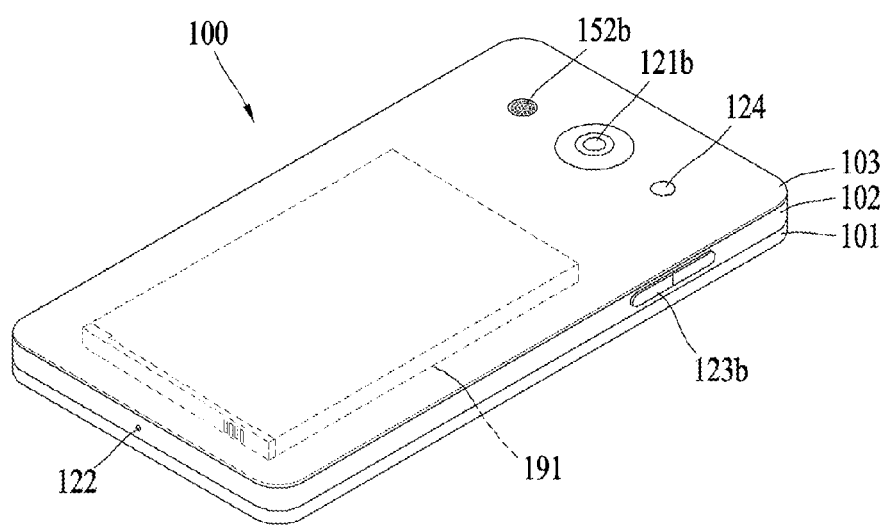

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
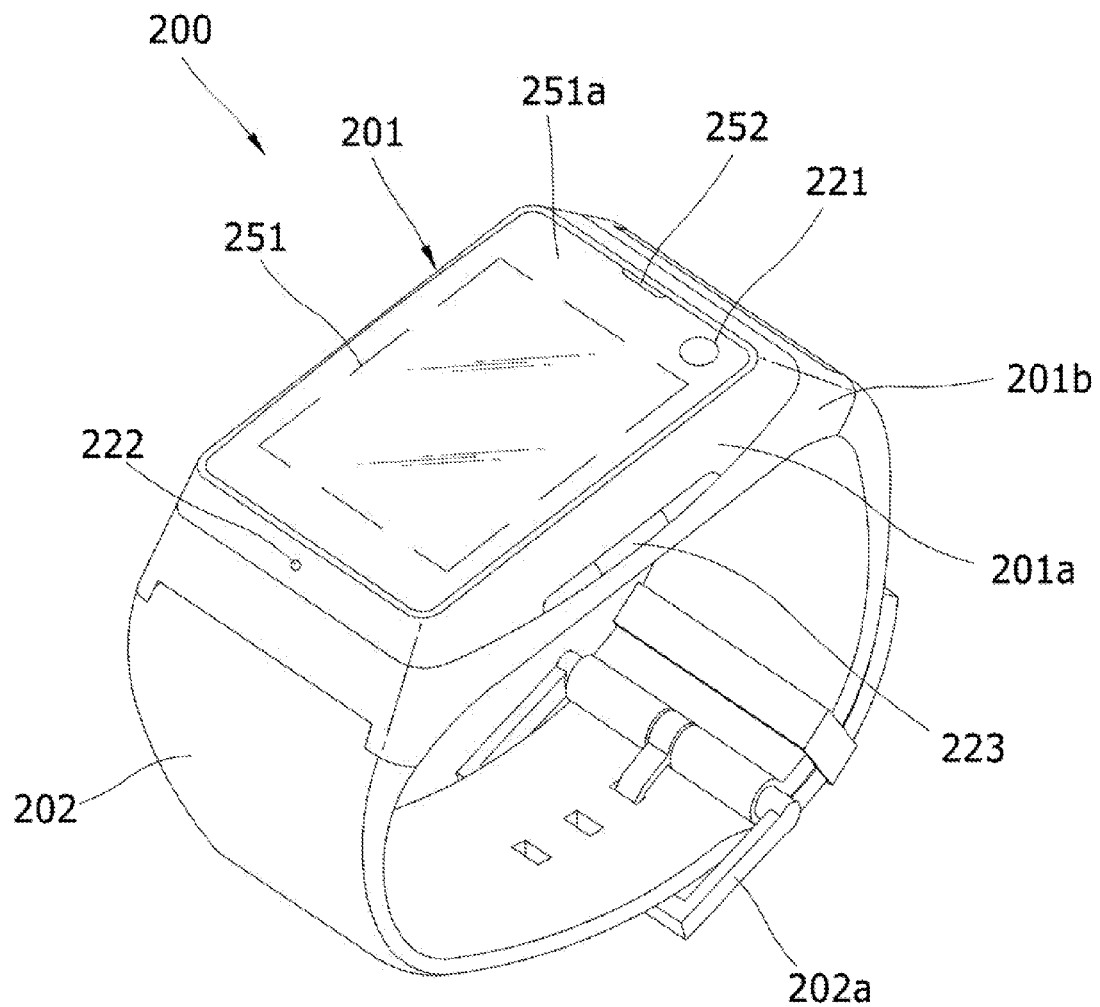
FIG. 2 is a perspective diagram for one example of a watch type mobile terminal related to another embodiment of the present invention.

FIG. 2 is a perspective view illustrating one example of a watch-type mobile terminal 200 in accordance with another exemplary embodiment. As illustrated in FIG. 2, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIGS. 1A-1C.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

The present invention relates to a mobile terminal of a watch type wearable on a wrist. Particularly, the present invention discloses a method of controlling a photographing operation of a photographing device through a mobile terminal 100 of a watch type. To this end, the mobile terminal 100 of the watch type may include at least one of the components shown in FIGS. 1A to 1C. In particular, assume that the mobile terminal 100 of the watch type according to the present invention may include the wireless communication unit 110, the sensing unit 140, the display unit 151, the memory 160 and the controller 180.

In the following description of embodiments, assume that the display unit 151 includes a touchscreen. If the display unit 151 includes the touchscreen, the display unit 151 can play both a role as an output device for outputting information and a role as an input device for receiving a user input.

Using the sensing unit 140, the mobile terminal 100 of the watch type is able to detect a movement of the mobile terminal 100, a tilt of the mobile terminal 100, a movement of a hand, and the like. In particular, the mobile terminal 100 of the watch type is able to detect a movement of the mobile terminal 100, a tilt of the mobile terminal 100 and the like through a tilt sensor, a gyro sensor, an acceleration sensor and/or the like.

The mobile terminal 100 of the watch type may be able to detect a movement of a hand of a user currently wearing the mobile terminal 100. If a user moves a finger, a muscle on a wrist connected to the finger is moved. Hence, the mobile terminal 100 of the watch type is provided with a pressure sensor configured to sense a pressure applied by the moved muscle on the wrist to a face confronting the user's wrist, an ultrasound sensor configured to obtain a movement of a muscle by emitting ultrasound waves and then sensing the reflected ultrasound waves, thereby being able to detect a movement of a hand of a user currently wearing the mobile terminal 100 of the watch type.

As mentioned in the above description, the movement of the mobile terminal 100, the tilt of the mobile terminal 100 or the movement of the hand of the user currently wearing the mobile terminal 100 or the like can be used as one example of a user input for manipulating the mobile terminal 100 of the watch type. In particular, a user currently wearing the mobile terminal 100 of the watch type according to the present invention may manipulate the mobile terminal 100 using the touchscreen, may manipulate the mobile terminal by moving or tilting the mobile terminal 100, or may manipulate the mobile terminal 100 by moving a hand by wearing the mobile terminal 100.

The mobile terminal 100 of the watch type is able to perform a wireless communication with a photographing device. In this case, if a prescribed electronic device (e.g., a smartphone, a tablet, a laptop, a PDA, a camera, etc.) is capable of a wireless communication and includes a camera, it can be regarded as belonging to a scope of the photographing device.

The mobile terminal 100 of the watch type and the photographing device can mutually communicate with each other using a short range communication technology. In this case, the short range communication technology may include one of Bluetooth, Wi-Fi, Wi-Fi Direct, NAN and the like, by which the present invention is non-limited.

Based on the above description, a mobile terminal 100 of the watch type according to the present invention is described in detail with reference to the accompanying drawings as follows.

Figure 3:
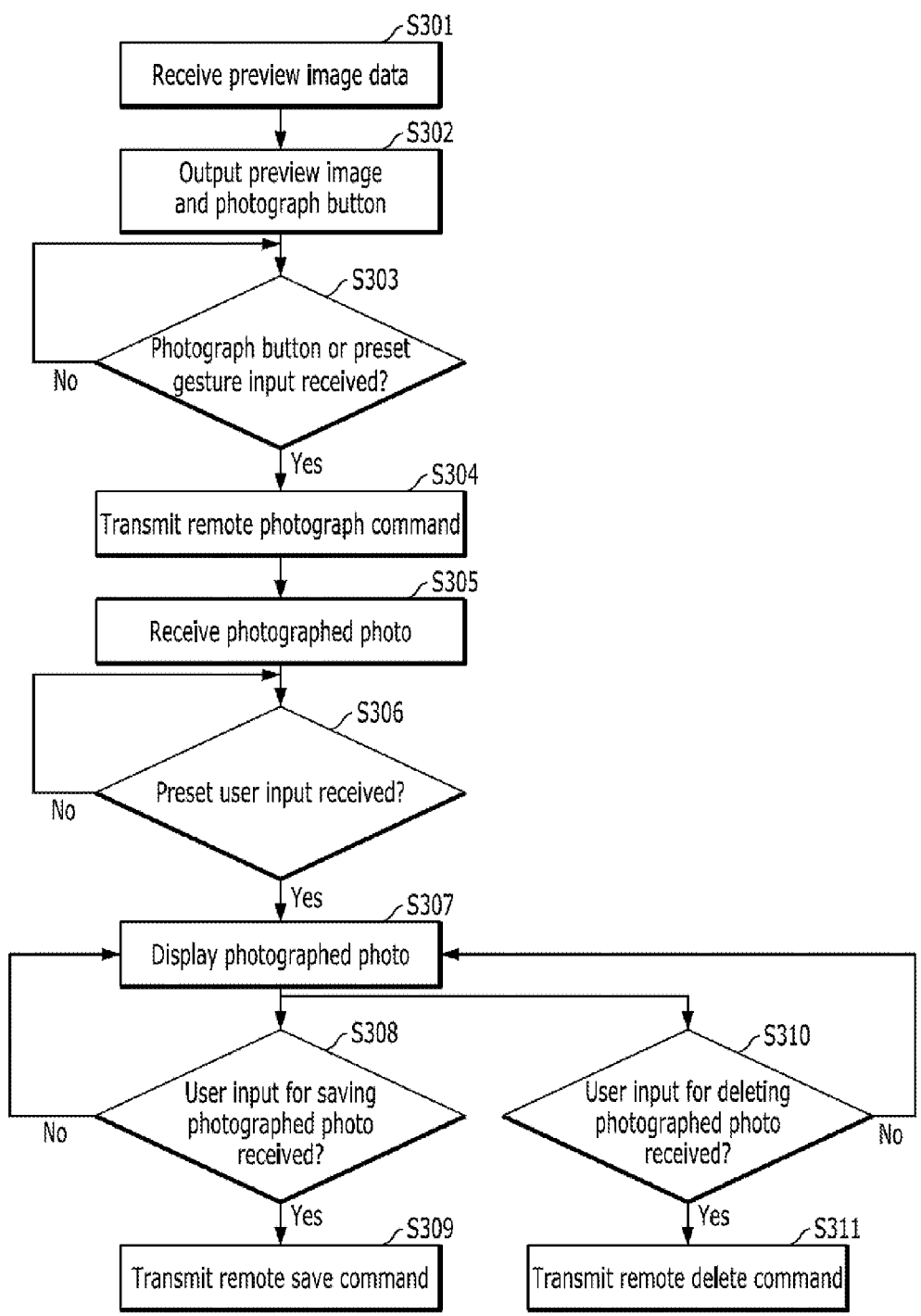
FIG. 3 is a flowchart for an operation of a watch type mobile terminal according to one embodiment of the present invention.

FIG. 3 is a flowchart for an operation of a watch type mobile terminal 100 according to one embodiment of the present invention. For clarity of the following description, assume that a wireless communication channel is established between a watch type mobile terminal 100 and a photographing device. And, assume that a camera of the photographing device is in activated state.

Referring to FIG. 3, the watch type mobile terminal 100 is able to receive preview image data from the photographing device through the wireless communication unit 110 [S301]. In doing so, the photographing device is able to transmit the preview image data created from encoding a preview image inputted through the camera to the watch type mobile terminal 100. In this case, the preview image may mean an image inputted through the camera of the photographing device before a photographing starts.

Once the preview image data is received, the controller 180 of the watch type mobile terminal 100 is able to control the preview image to be outputted through the display unit 151 by decoding the preview image data [S302]. Hence, both of the watch type mobile terminal 100 and the photographing device may be able to display the preview image inputted through the camera of the photographing device.

For another instance, if the preview image is outputted through the watch type mobile terminal 100, since it is expected that a user may watch the preview image through the watch type mobile terminal 100, the photographing device transmits the preview image data to the watch type mobile terminal 100 and is also able to interrupt the output of the preview image. Therefore, the photographing device may be able to minimize its power consumption.

After a communication channel has been established between the mobile terminal 100 and the photographing device, if a preset gesture input is applied, the controller 180 may be able to control the preview image to be outputted through the display unit 151.

For instance, FIG. 4 is a diagram for one example of outputting a preview image in response to a gesture input according to one embodiment of the present invention. Referring to FIG. 4, while the photographing device and the mobile terminal 100 are connected to each other, if a gesture of pulling the mobile terminal 100 toward a user body is inputted, the controller 180 can control a preview image to be outputted.

Before the gesture of pulling the mobile terminal 100 toward the user body is inputted, the mobile terminal 100 may receive preview image data from the photographing device. Alternatively, if the gesture of pulling the mobile terminal 100 toward the user body is inputted, the mobile terminal 100 may be then able to receive preview image data from the photographing device. Yet, in any cases, only if the gesture of pulling the mobile terminal 100 toward the user body is inputted, it is a matter of fact that the preview image can be outputted.

In general, such a photographing device as a smartphone, a tablet, a camera or the like employs the display unit 151 of which horizontal and vertical sides are different from each other. For instance, if a smartphone is held in a horizontal direction, an aspect ratio of the display unit 151 is generally set to one of 16:9, 16:10, 4:3 and the like. The photographing device can set an aspect ratio of the preview image to fit that of the display unit 151. Alternatively, the photographing device may set an aspect ratio of the preview image to meet the user's settings. For instance, if the aspect ratio of the display unit of the photographing device is set to 16:9, the photographing device can create a preview image having an aspect ratio set to the same aspect ratio (i.e., 16:9) of the display unit. Alternatively, the photographing device may create a preview image having an aspect ratio set to 16:10 or 4:3 different from the aspect ratio of the display unit according to user settings.

Moreover, the photographing device can change an aspect ratio of a preview image depending on whether the display unit operates in landscape mode or portrait mode. For instance, when the photographing device operates in landscape mode, an aspect ratio of a preview image is set to 16:9. If so, when the photographing device operates in portrait mode, the aspect ratio of the preview image can be set to 9:16. Hence, if the photographing device operates in the landscape mode, a width of the preview image may be greater than a height of the preview image. If the photographing device operates in the portrait mode, the height of the preview image may be greater than the width of the preview image.

If an aspect ratio of the display unit 151 of the watch type mobile terminal 100 is equal to that of the preview image, the watch type mobile terminal 100 may have no difficulty in completely displaying the preview image received from the photographing device. For instance, if the aspect ratio of the preview image is 16:9 and the aspect ratio of the watch type mobile terminal 100 is 16:9, the controller 180 can display the preview image on the display unit 151 completely.

Yet, if the aspect ratio of the display unit 151 of the watch type mobile terminal 100 is different from that of the preview image or the display unit 151 of the watch type mobile terminal 100 has a circular shape, it is difficult to completely display the preview image received from the photographing device.

Hence, although the preview image is lost in part (i.e., it is unable to completely display the preview image), the watch type mobile terminal 100 can display the preview image in a manner that one of a width and height of the display unit 151 is adapted to a horizontal or vertical length of the preview image.

For instance, FIGS. 5A to 5D are diagrams for examples of outputting a preview image according to one embodiment of the present invention. For clarity of the following description, in FIGS. 5A and 5B, assume that the display unit 151 has a rectangular shape having an aspect ratio set to 1:1. In FIGS. 5C and 5D, assume that the display unit 151 has a circular shape.

Referring to FIG. 5A, since the photographing device is in portrait mode, if a vertical length of a preview image obtained from the photographing device is greater than a horizontal length of the preview image, the controller 180 can display the preview image in a manner of adapting the horizontal length of the preview image to a width of the display unit 151. In this case, since the vertical length of the display unit 151 is equal to the horizontal length of the display unit 151, at least one of a top region and a bottom region of the preview image may not be outputted through the display unit 151.

Referring to FIG. 5B, since the photographing device is in landscape mode, if a horizontal length of a preview image obtained from the photographing device is greater than a vertical length of the preview image, the controller 180 can display the preview image in a manner of adapting the vertical length of the preview image to a height of the display unit 151. In this case, since the vertical length of the display unit 151 is equal to the horizontal length of the display unit 151, at least one of a left region and a right region of the preview image may not be outputted through the display unit 151.

When the display unit has a circular shape, a corresponding example is described as follows. First of all, since the photographing device is in portrait mode, if a vertical length of a preview image obtained from the photographing device is greater than a horizontal length of the preview image, the controller 180 can display the preview image in a manner of adapting the horizontal length of the preview image to a length equal to or smaller than a diameter of the display unit 151. Referring to FIG. 5C, the preview image is displayed in a manner that the horizontal length of the preview image is adapted to the length smaller than the diameter. In this case, it may happen that at least one of a top region and a bottom region of the preview image is not outputted through the display unit 151.

Like the examples shown in FIGS. 5A to 5D, the controller 180 can display a preview image created in portrait mode in a manner that a horizontal length of the preview image is adapted to a width (or a length equal to or smaller than a diameter) of the display unit 151. And, the controller 180 can display a preview image created in landscape mode in a manner that a vertical length of the preview image is adapted to a height (or a length equal to or smaller than a diameter) of the display unit 151.

In case that a photo photographed through the photographing device is outputted through the watch type mobile terminal 100, the embodiment described with reference to FIGS. 5A to 5D can be applied.

In response to a gesture input received during an output of a preview image, the controller 180 can enlarge or reduce the preview image.

Figure 6A:
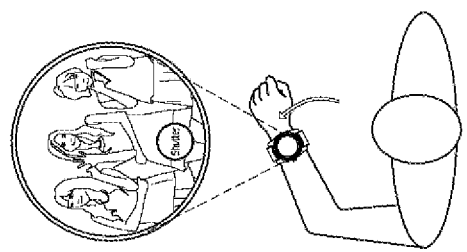
FIGS. 6A and 6B are diagrams for one example of enlarging or reducing a preview image in response to a gesture input according to one embodiment of the present invention.
Figure 6B:
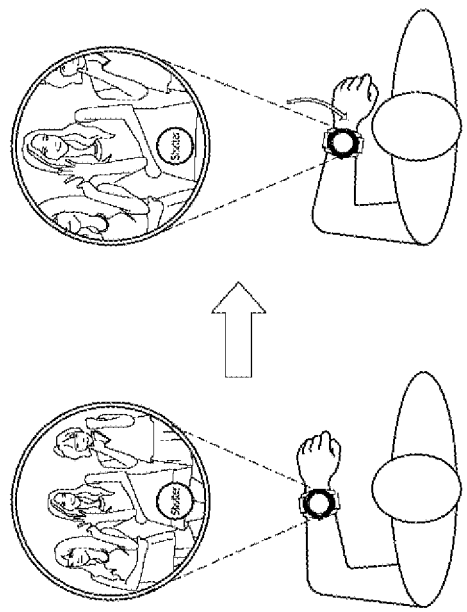

For instance, FIGS. 6A and 6B are diagrams for one example of enlarging or reducing a preview image in response to a gesture input according to one embodiment of the present invention. Referring to FIG. 6A, if a gesture input of folding an arm having the mobile terminal 100 worn thereon toward a user body is received, the controller 180 can control a preview image to be enlarged. On the other hand, referring to FIG. 6B, if a gesture input of unfolding an arm having the mobile terminal 100 worn thereon in an outer direction of the user body is received, the controller 180 can control a preview image to be reduced.

For clarity, FIGS. 6A and 6B show that an action of folding/unfolding an arm is taken as an example of a gesture for enlarging/reducing a preview image, by which the present invention is non-limited. For instance, another gesture input different from the illustrated gesture input can be set for enlarging or reducing a preview image.

In case that a photo photographed through the photographing device is outputted through the watch type mobile terminal 100, the embodiment described with reference to FIGS. 6A and 6B may be applicable.

The controller 180 can control a photograph button 412, which is provided to remotely control the photographing device, to be outputted together with the preview image [cf. FIG. 4]. If the photograph button is touched or a preset gesture is inputted [S303], the controller 180 can transmit a remote photographing command for the photographing device to perform a photographing [S304]. In response to the remote photographing command, the photographing device can perform the photographing.

For instance, if the photograph button is touched or a gesture of clenching a user's first of a hand having the mobile terminal 100 worn thereon and then opening the hand (or a gesture of opening the hand and then clenching the first) is received, the controller 180 can transmit a remote photographing command to the photographing device.

After a gesture of swaying the mobile terminal 100 has been inputted by clenching the first (or opening the hand), if a gesture of opening the hand (or a gesture of clenching the first) is additionally inputted, the controller 180 can set a photographing standby time amounting to a count of swaying the mobile terminal 100. After the elapse of the set photographing standby time, a photographing can be performed through the photographing device.

For instance, FIG. 7 is a diagram for one example of controlling a photographing device remotely according to one embodiment of the present invention. For clarity of the following description, assume that an action of clenching a first and then opening a corresponding hand is a gesture for transmitting a remote photographing command to the photographing device.

After a gesture of swaying the mobile terminal 100 by clenching a first has been inputted, if a gesture of opening a corresponding hand is inputted, the controller 180 sets a photographing standby time amounting to a count of swaying the mobile terminal 100 and is then able to transmit a photographing standby time information and a remote photographing command to the photographing device. Referring to FIG. 7, if a user sways the mobile terminal 100 three times until clenching a first and then opening a hand, the controller 180 sets the photographing standby time to 3 seconds and is able to transmit a remote photographing command to the photographing device together with information on the set photographing standby time.

Having received the photographing standby time information and the remote photographing command, the photographing device can start the photographing after the elapse of the photographing standby time.

For another instance, after the elapse of the photographing standby time, the controller 180 may be able to transmit the remote photographing command to the photographing device.

According to each of the embodiment of transmitting the photographing standby time information and the remote photographing command to the photographing device and the embodiment of transmitting the remote photographing command to the photographing device after the elapse of the photographing standby time, the photographing device may be able to start the photographing after the elapse of the photographing standby time.

For clarity of the description, according to the example shown in FIG. 7, an action of clenching a first of a hand having the mobile terminal 100 worn thereon and then opening the hand is taken as an example of a user's gesture for creating a remote photographing command. And, it is a matter of course that a gesture (e.g., a gesture of pulling a wrist having the mobile terminal 100 worn thereon toward a user's body, a gesture of swaying the mobile terminal 100, a gesture of rotating a wrist having the mobile terminal 100 worn thereon, etc.) different from the illustrated can be utilized as a user's gesture for creating a remote photographing command. Moreover, while an arm having the mobile terminal 100 worn thereon is lowered, if any movement of the mobile terminal 100 fails to occur for a prescribed time, a remote photographing command may be created.

For clarity of the description, according to the example shown in FIG. 7, an action of swaying an arm having the mobile terminal 100 worn thereon is taken as an example of a user's gesture for setting a photographing standby time. And, it is a matter of course that a gesture different from the illustrated can be used as a user's gesture for setting a photographing standby time. For instance, an action of unfolding finger(s) can be used as a gesture for setting a photographing standby time. In particular, a photographing standby time can be set in proportion to the number of unfolded fingers. For example, a photographing standby time can be set in a manner that the number of unfolded fingers is set as second units. For another example, a gesture of rotating a wrist having the mobile terminal 100 worn thereon can be used as a gesture for setting a photographing standby time. In this case, a photographing standby time can be set in proportion to a count of rotations of the wrist. For instance, a photographing standby time can be set in a manner that the count of wrist rotations is set as second units.

If the photo is photographed through the photographing device, the mobile terminal 100 can receive the photo from the photographing device [S305]. In this case, it is not necessary for the photo, which is received by the mobile terminal 100 from the photographing device, to be an original copy. For instance, the photographed photo sent to the mobile terminal 100 by the photographing device may include a thumbnail image of the photographed photo or an image compressed into a small size by lowering an image quality of the photographed photo.

After the photographed photo has been received, if a preset user input is received [S306], the controller 180 can control the photographed photo to be outputted through the display unit 151 [S307].

Figure 8:
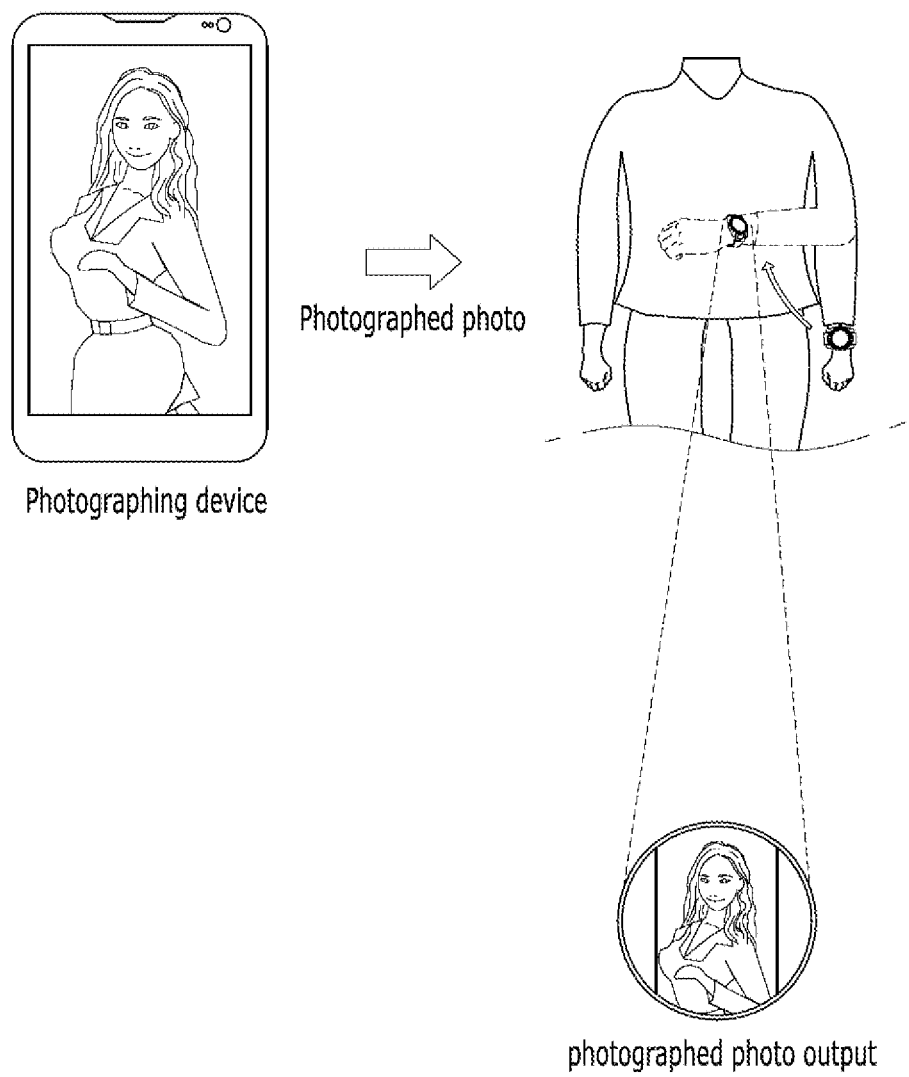
FIG. 8 is a diagram for one example of outputting a photographed photo according to one embodiment of the present invention.

For instance, FIG. 8 is a diagram for one example of outputting a photographed photo according to one embodiment of the present invention. If the mobile terminal 100 transmits a remote photographing command to the photographing device, the photographing device can photograph a photo in response to the remote photographing command. As mentioned in the foregoing description, a remote photographing command can be transmitted to the photographing device in response to a user input of touching a shutter button, a gesture input of clenching and opening a fist, or the like.

If a photo is photographed through the photographing device, the controller 180 can control a feedback, which notifies that the photo has been photographed through the photographing device, to be outputted. In doing so, the feedback may include at least one of an output of vibration, an output of a photographing sound, an output of light from LED (light emitting diose), and the like.

Once the photo is photographed through the photographing device, the photographing device can sent the photographed photo. After the photo has been photographed through the photographing device, the controller 180 can output a preview image until a gesture of pulling the mobile terminal 100 toward a user's body is inputted by the user.

While the preview image is outputted, if gesture of pulling the mobile terminal 100 toward a user's body is received, like the example shown in FIG. 8, the controller 180 can control the photographed photo to be outputted through the display unit 151.

According to the example shown in FIG. 8, the photographed photo is outputted only if the gesture of pulling the mobile terminal 100 toward a user's body is inputted. Unlike the example shown in FIG. 8, irrespective of whether the gesture of pulling the mobile terminal 100 toward a user's body is inputted, if the photo is received from the photographing device, the controller 180 can control the photographed photo to be outputted in direct.

While the photographed photo is outputted, if a user input for saving the photographed photo is received [S308], the controller 180 can transmit a remote save command to the photographing device [S309]. Having received the remote save command, the photographing device can save the photographed photo to a storage place.

On the other hand, while the photographed photo is outputted, if a user input for deleting the photographed photo is received [S310], the controller 180 can transmit a remote delete command to the photographing device [S311]. Having received the remote delete command, the photographing device can delete the photographed photo.

Figure 9A:
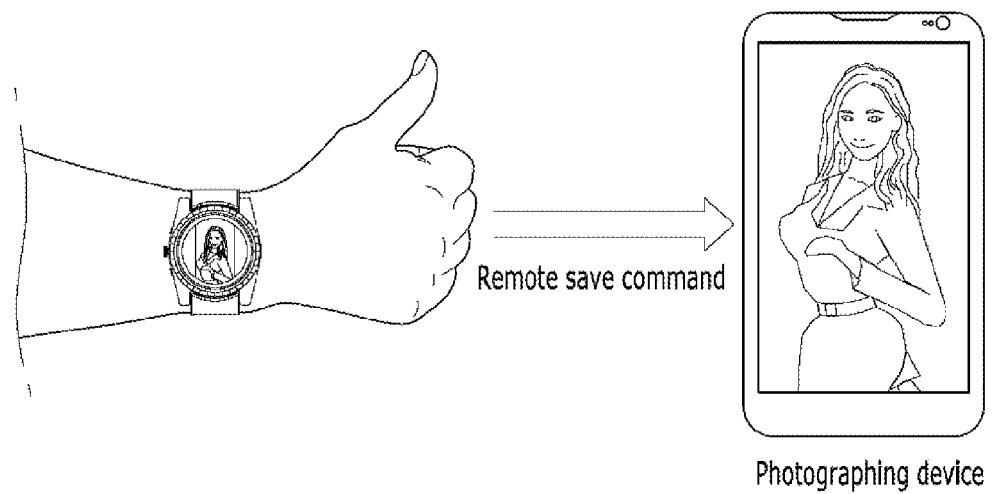

FIG. 9A and FIG. 9B are diagrams for examples of operating a photographing device in response to a remote save command or a remote delete command according to one embodiment of the present invention. For clarity of the following description, assume that a user input for creating a remote save command is an action of having a thumb face a top direction by unfolding the thumb having the mobile terminal 100 worn thereon. And, assume that a user input for creating a remote delete command is an action of having a thumb face a bottom direction by unfolding the thumb having the mobile terminal 100 worn thereon.

Referring to FIG. 9A, while a photographed photo is displayed, if a gesture of holding a thumb in a top direction by unfolding the thumb is received, the controller 180 can transmit a remote save command to the photographing device. Having received the remote save command, the photographing device can save the photographed photo to a preset location. In this case, the preset location may include at least one of an internal storage place of the photographing device and an external storage place (e.g., a cloud server, etc.). Alternatively, the preset location may include a specific folder in the internal storage place or a specific folder in the external storage place.

Referring to FIG. 9B, while a photographed photo is displayed, if a gesture of holding a thumb in a bottom direction by unfolding the thumb is received, the controller 180 can transmit a remote delete command to the photographing device. Having received the remote delete command, the photographing device can delete the photographed photo. In doing so, the photo received from the photographing device by the mobile terminal 100 may be deleted as well.

Before the remote delete command is created, like the example shown in FIG. 9B, the controller 180 may control a menu, which is provided to enable a user check whether to delete the photographed photo, to be outputted. If the user confirms to delete the photo (i.e., a delete button in the menu is selected), the controller 180 may be able to transmit the remote delete command to the photographing device.

According to the examples shown in FIG. 9A and FIG. 9B, in response to a gesture of holding a thumb in a top direction and a gesture of holding a thumb in a bottom direction, a remote save command and a remote delete command are created, respectively. Yet, the gesture for creating the remote save command and the gesture for creating the remote delete command are non-limited by the examples shown in FIG. 9A and FIG. 9B. Gestures of types different from those shown in FIG. 9A and FIG. 9B can be used to create the remote save command and the remote delete command. Moreover, the remote save/delete command can be created by a touch input of touching the display unit 151 as well as by the gesture input.

In response to a gesture input received in the course of outputting a photo, the controller 180 can enlarge or reduce the photo. For instance, as mentioned in the foregoing description with reference to FIG. 6, in response to a gesture input of folding an arm having the mobile terminal 100 worn thereon toward a user body, the controller 180 can enlarge a photo. In response to a gesture input of unfolding an arm having the mobile terminal 100 worn thereon toward an outside of a user body, the controller 180 can reduce a photo.

If a photographed photo is a photo of a character, when the photo is enlarged, the controller 180 can control the photo to be enlarged centering on a face of the photographed character.

Figure 10:
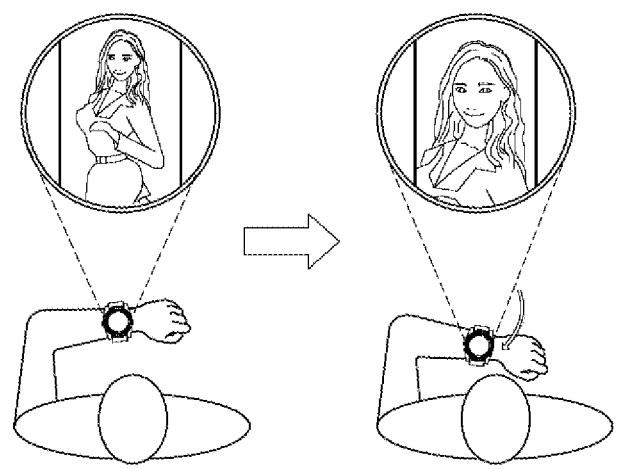
FIG. 10 is a diagram for one example of enlarging a photo centering on a face of a photographed character according to one embodiment of the present invention.

FIG. 10 is a diagram for one example of enlarging a photo centering on a face of a photographed character according to one embodiment of the present invention.

Referring to FIG. 10, while a photo of a photographed character is outputted through the display unit 151, if a gesture for enlarging the photo (e.g., a gesture of folding an arm having the mobile terminal 100 worn thereon toward a user body) is received, the controller 180 can control the photo to be enlarged centering on a face of the photographed character in the photo. As the photo is enlarged centering on the face of the character in the photo, the face of the character in the photo can be displayed on the display unit 151 by being enlarged.

If a plurality of characters are photographed in a photo, the controller 180 can enlarge the photo centering on a face of a prescribed one of a plurality of the characters. In doing so, the controller 180 can select a character becoming the reference of the photo enlargement from a character randomly selected from a plurality of the characters, a character located at the center of the photo among a plurality of the characters, a character located at a far right side (or a far left side) of the photo among a plurality of the characters, and a user currently wearing the mobile terminal 100 (or a user registered at the mobile terminal 100).

Figure 11:
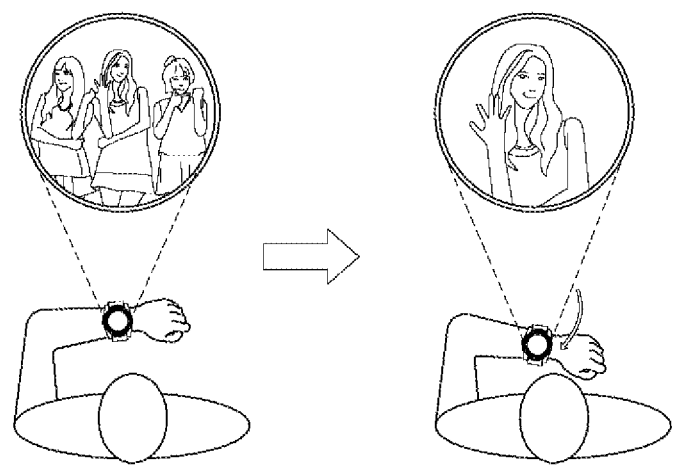
FIG. 11 is a diagram for one example of enlarging a photo centering on a face of a prescribed one of a plurality of characters according to one embodiment of the present invention.

For instance, FIG. 11 is a diagram for one example of enlarging a photo centering on a face of a prescribed one of a plurality of characters according to one embodiment of the present invention.

Referring to FIG. 11, while a photo of a plurality of photographed characters is outputted through the display unit 151, if a gesture for enlarging the photo (e.g., a gesture of folding an arm having the mobile terminal 100 worn thereon toward a user body) is received, the controller 180 can control the photo to be enlarged centering on a face of a prescribed one of a plurality of the photographed characters in the photo. According to the example shown in FIG. 11, the photo is enlarged centering on the face of the character located at the center of the photo. As the photo is enlarged centering on the face of a prescribed one of the photographed characters, the face of the prescribed one of a plurality of the characters can be displayed on the display unit 151 by being enlarged.

While the photo is enlarged, if an additional gesture is inputted, the controller 180 can control the photo to be outputted centering on a face of a next (or previous) character by maintaining the enlarged state of the photo.

Figure 12A:
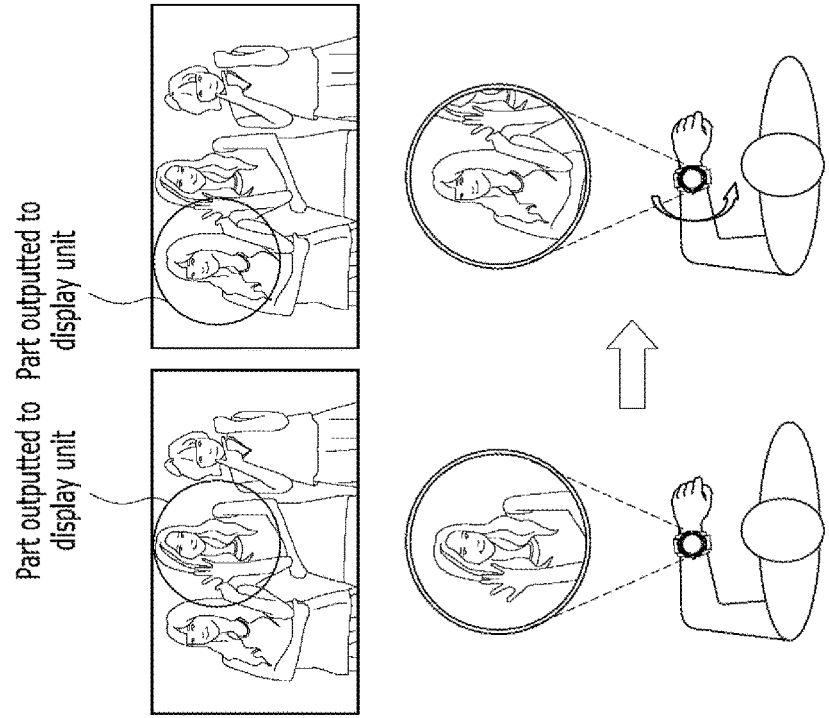
FIGS. 12A and 12B are diagrams for one example of when a face of a prescribed one of a plurality of characters is enlarged and displayed, enlarging and displaying a face of another character in response to a gesture input according to one embodiment of the present invention.
Figure 12B:
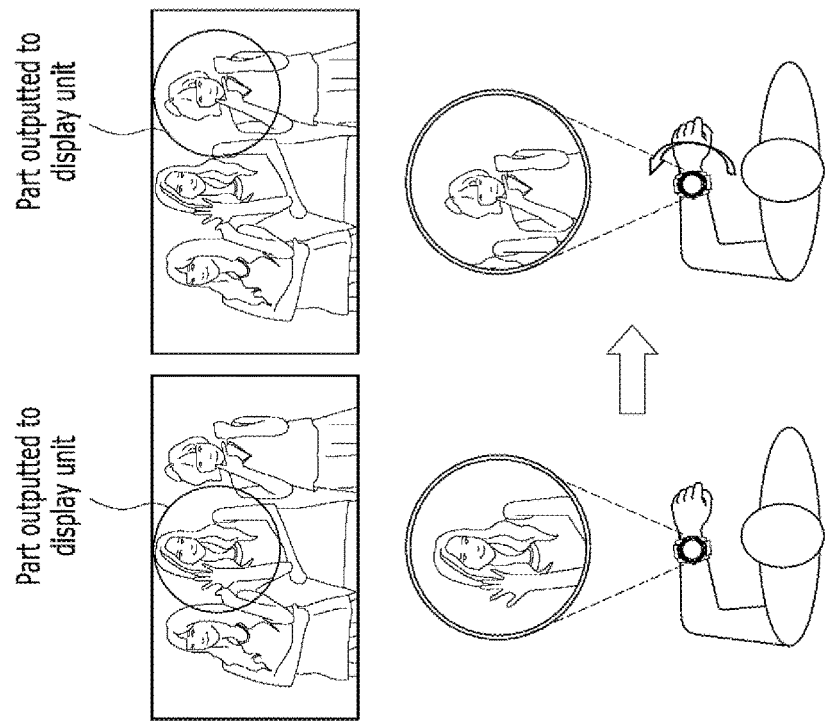

For instance, FIGS. 12A and 12B are diagrams for one example of when a face of a prescribed one of a plurality of characters is enlarged and displayed, enlarging and displaying a face of another character in response to a gesture input according to one embodiment of the present invention. For clarity of the following description, assume that a gesture input for outputting a photo centering on a face of another character is an input of rotating a writ having the mobile terminal worn thereon in a first direction or a second direction.

Referring to FIG. 12A, while a face of a prescribed one of a plurality of characters is displayed by being enlarged, if a gesture of rotating the mobile terminal 100 in a first direction is received, the controller 180 can control a face of a next character to be displayed in a manner of being enlarged. In this case, the next character may include a character located at a right (or left) side of the character displayed by being enlarged among a plurality of the characters or a prescribed one randomly selected from the rest of the characters except the character displayed by being enlarged among a plurality of the characters.

Referring to FIG. 12B, while a face of a prescribed one of a plurality of characters is displayed by being enlarged, if a gesture of rotating the mobile terminal 100 in a second direction is received, the controller 180 can control a face of a previous character to be displayed in a manner of being enlarged. In this case, the previous character may include a character located at a left (or right) side of the character displayed by being enlarged among a plurality of the characters or a prescribed one randomly selected from the rest of the characters except the character displayed by being enlarged among a plurality of the characters.

If a gesture of lowering the arm pulled up toward a user body is inputted, the controller 180 stops outputting the photo and is able to control the preview image to be outputted again.

Figure 13:
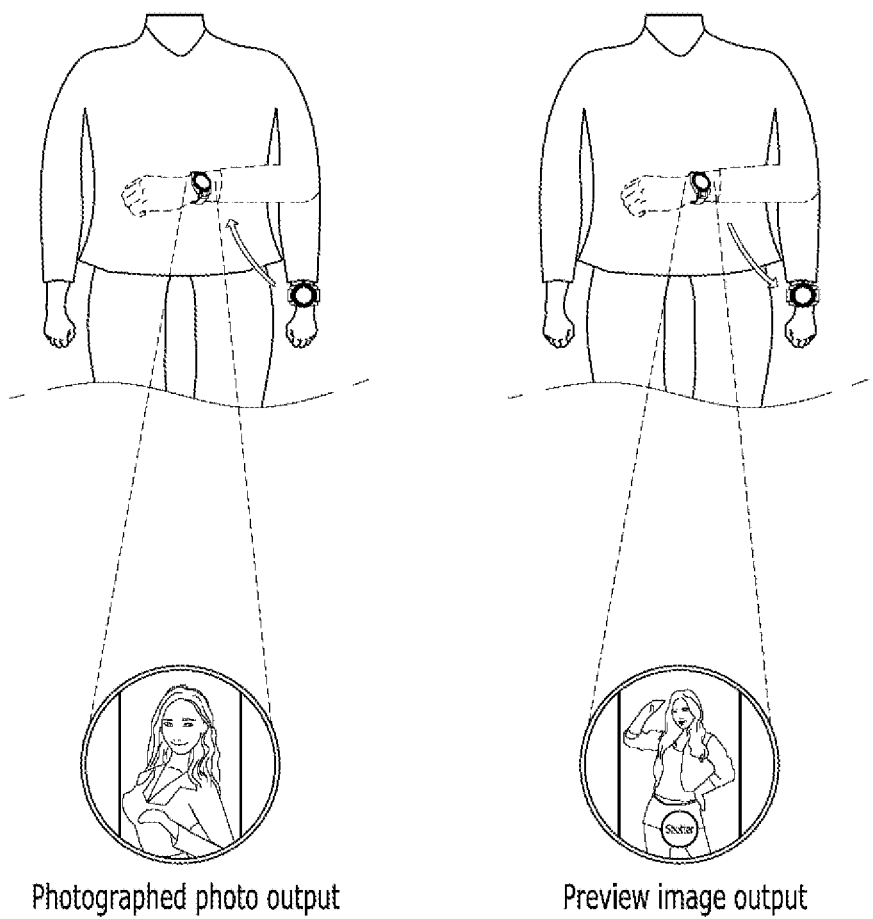
FIG. 13 is a diagram for one example of outputting a preview image by interrupting an output of a photo according to one embodiment of the present invention.

For instance, FIG. 13 is a diagram for one example of outputting a preview image by interrupting an output of a photo according to one embodiment of the present invention.

Referring to FIG. 13, after a photo has been photographed, if a gesture of puling the mobile terminal 100 toward a user body is inputted, the controller 180 can control the photo received from a photographing device to be outputted. While the photo is outputted, if a gesture of lowering the arm pulled toward a user body is inputted, the controller 180 stops outputting the photo and is able to control a preview image to be outputted. While the preview image is outputted, the controller 180 may be able to transmit a remote control command to the photographing device in response to a user input.

In particular, a user watches the photographed photo by taking a gesture of pulling the mobile terminal 100 toward the user body and is also able to control a state of remotely controlling the photographing device to be entered by taking a gesture of lowering the mobile terminal 100.

In case that a photographing device is connected to a plurality of mobile terminals 100, the photographing device can receive a remote photograph command from each of a plurality of the mobile terminals 100. A photo photographed in response to a reception of a remote photograph command from a prescribed one of a plurality of the mobile terminals 100 can be transmitted to all of a plurality of the mobile terminals 100 or may be transmitted to the mobile terminal 100 having transmitted the remote photograph command only.

Figure 14:
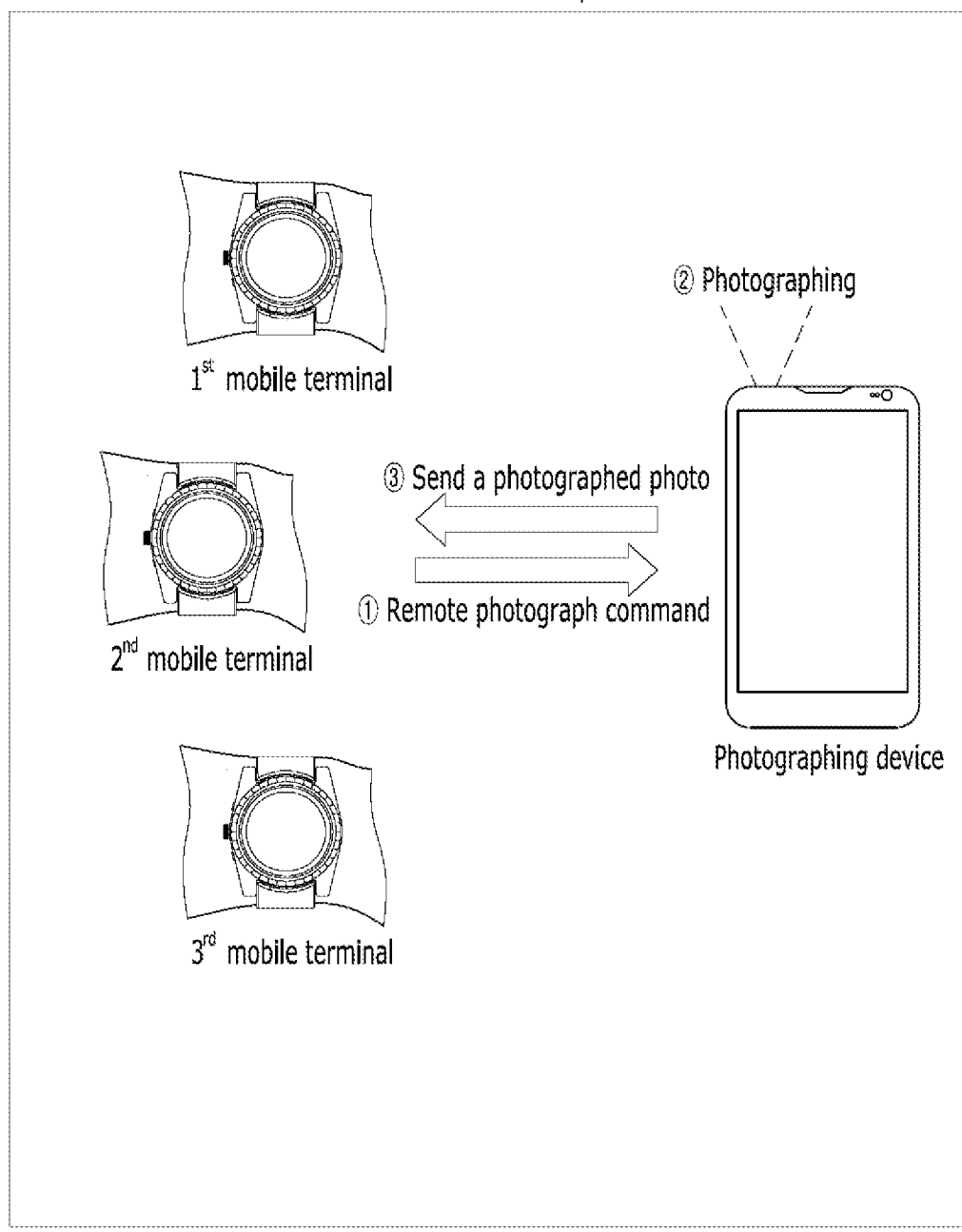
FIG. 14 is a diagram for one example to describe an operation of a photographing device currently connected to a plurality of mobile terminals according to one embodiment of the present invention.

For instance, FIG. 14 is a diagram for one example to describe an operation of a photographing device currently connected to a plurality of mobile terminals according to one embodiment of the present invention.

If a photographing device is currently connected to a plurality of mobile terminals 100, the photographing device can transmit a preview image to each of a plurality of the mobile terminals 100. Thereafter, if a remote photograph command is received from a prescribed one of a plurality of the mobile terminals 100, a photo can be photographed through the photographing device. For instance, referring to FIG. 14, while the photographing device is connected to a first mobile terminal 100, a second mobile terminal 100 and a third mobile terminal 100, if the photographing device receives a remote photograph command from the second mobile terminal 100, a photo can be photographed through the photographing device.

Once the photo is photographed, the photographing device is able to forward the photographed photo to the mobile terminal 100 having transmitted the remote photograph command. According to the example shown in FIG. 14, the photographed photo is forwarded to the second mobile terminal 100 having transmitted the remote photograph command only among the first to third mobile terminals 100.

For another instance, the photographing device can forward the photographed photo to all of the mobile terminals 100. Although the photo is photographed by receiving the remote photograph command from the second mobile terminal 100 for example, the photographing device can send the photographed photo to all of the first to third mobile terminals 100.

According to the example shown in FIG. 14, if the photographing device receives a remote photograph command from a prescribed one of a plurality of the mobile terminals 100, a photo can be photographed through the photographing device. Unlike the example shown in FIG. 14, only if the photographing device receives the remote photograph command from all of a plurality of the mobile terminals 100, a photo can be photographed through the photographing device.

Figure 15:
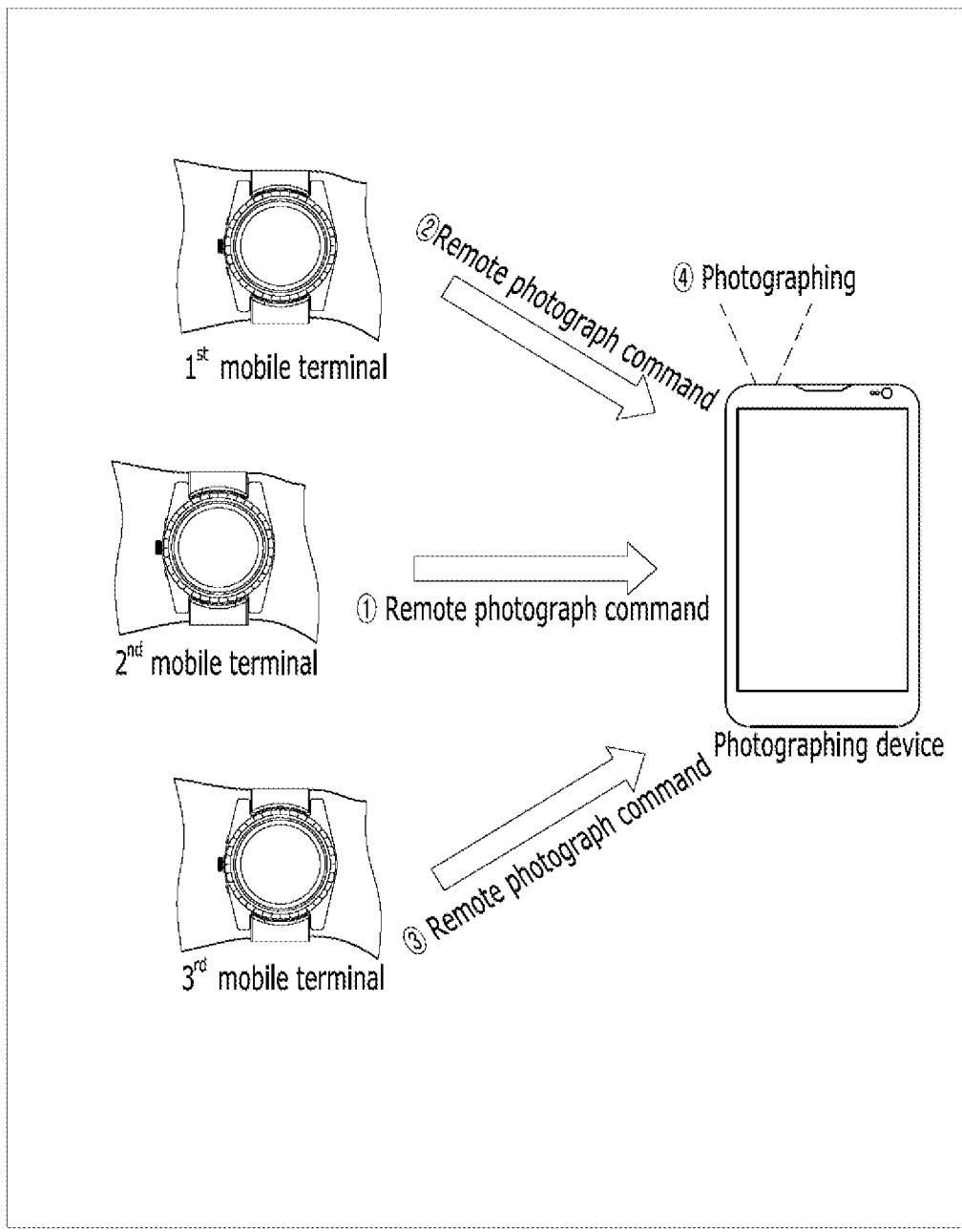
FIG. 15 is a diagram for another example to describe an operation of a photographing device currently connected to a plurality of mobile terminals according to one embodiment of the present invention.

For instance, FIG. 15 is a diagram for another example to describe an operation of a photographing device currently connected to a plurality of mobile terminals according to one embodiment of the present invention.

If a photographing device is currently connected to a plurality of mobile terminals 100, the photographing device can transmit a preview image to each of a plurality of the mobile terminals 100. Thereafter, if a remote photograph command is received from every one of a plurality of the mobile terminals 100, a photo can be photographed through the photographing device. For instance, referring to FIG. 15, while the photographing device is connected to a first mobile terminal 100, a second mobile terminal 100 and a third mobile terminal 100, if the photographing device receives a remote photograph command from every one of the first to third mobile terminals 100, a photo can be photographed through the photographing device.

For instance, assuming that the mobile terminal 100 transmits a remote photograph command to the photographing device after the elapse of a prescribed time without movement of the mobile terminal 100, if every one of the first mobile terminal 100, the second mobile terminal and the third mobile terminal 100 does not move over the prescribed time, a photo can be photographed through the photographing device.

In doing so, after the photographing device has received the remote photograph command from a prescribed one of a plurality of the mobile terminals 100, only if the photographing device receives the remote photograph command from another mobile terminal 100 within a prescribed time, the photographing device can handle the previously received remote photograph command as a valid command.

Like the example shown in FIG. 15, after the photographing device has received the remote photograph command from the second mobile terminal 100, if the photographing device receives the remote photograph command from the first mobile terminal 100 before the expiration of the prescribed time, the photographing device can handle the remote photograph command received from the second mobile terminal 100 as a valid command.

On the other hand, after the elapse of the prescribed time from the reception of the photograph command from the second mobile terminal 100, if the photographing device receives the remote photograph command from the first mobile terminal 100, the photographing device handles the remote photograph command received from the second mobile terminal 100 as an invalid command but is able to handle the remote photograph command received form the first mobile terminal 100 as an initially received remote photograph command.

If the photographing is completed, the photographing device can transmit the photographed photo to a representative one of a plurality of the mobile terminals 100. In this case, the representative mobile terminal 100 may include one of a prescribed mobile terminal 100 randomly selected from a plurality of the mobile terminals 100, a mobile terminal 100 initially (or last) connected to the photographing device, a mobile terminal 100 having transmitted an initial (or last) remote photograph command to the photographing device, and a mobile terminal 100 selected from a plurality of the mobile terminals 100 by a user's vote.

For another instance, if the photographing is completed, the photographing device may be able to send the photographed photo to every one of a plurality of the mobile terminals 100.

Each of a plurality of the mobile terminals 100 connected to the photographing device can output the preview image received from the photographing device. While the preview image is outputted, each of a plurality of the mobile terminals 100 can enlarge or reduce the preview image based on a received gesture input [refer to FIG. 5 for details]. In doing so, each of a plurality of the mobile terminals 100 can control the preview image to be enlarged centering on a user currently wearing the corresponding mobile terminal 100 (or a user registered at the corresponding mobile terminal 100) in the preview image.

Figure 16:
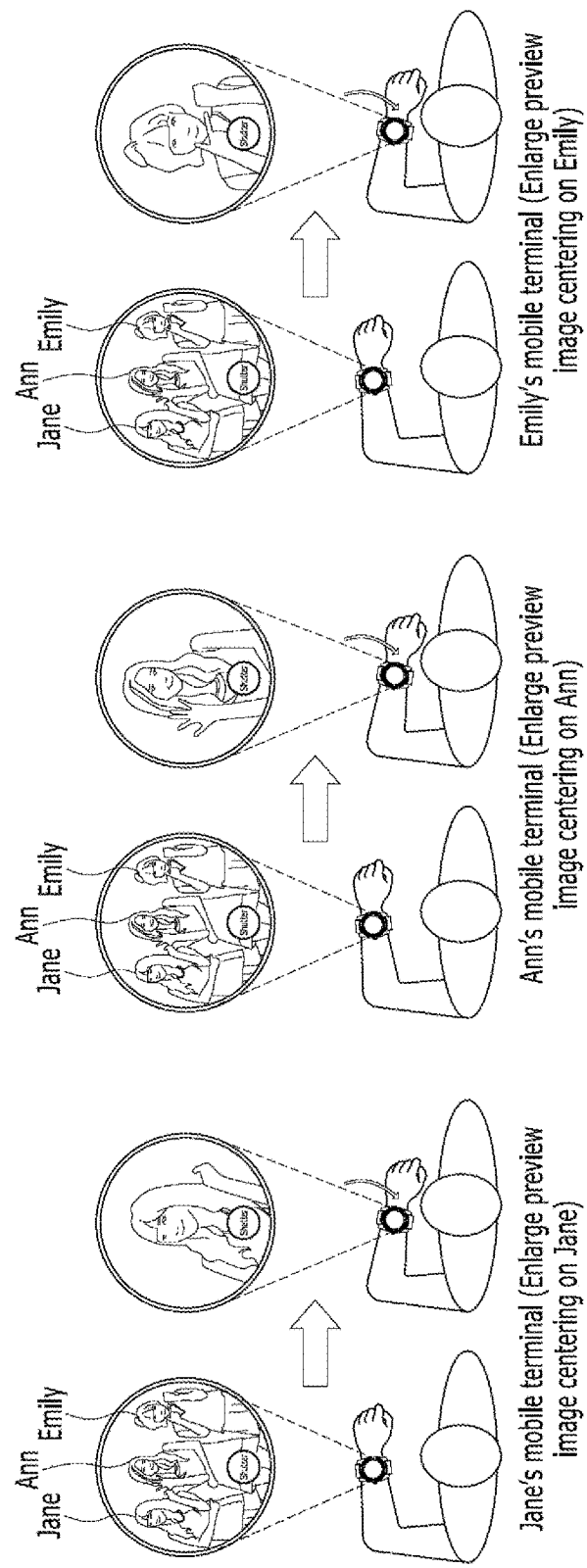
FIG. 16 is a diagram for one example of enlarging a preview image centering on a user currently wearing a mobile terminal according to one embodiment of the present invention.

For instance, FIG. 16 is a diagram for one example of enlarging a preview image centering on a user currently wearing a mobile terminal according to one embodiment of the present invention. For clarity of the following description, users currently wearing a first mobile terminal 100, a second mobile terminal 200 and a third mobile terminal 100 shall be named Jane, Ann and Emily, respectively.

Referring to FIG. 16, each of the first to third mobile terminals 100 can receive a preview image from a photographing device and is then able to output the received preview image. In doing so, if a gesture for enlarging the preview image (e.g., a gesture of folding an arm toward a user body, etc.) is received by each of the mobile terminals 100, each of the mobile terminals 100 can enlarge the preview image.

In doing so, each of the mobile terminals 100 can preview the preview image centering on a face of a user currently wearing each of the mobile terminals 100.

For instance, the first mobile terminal 100 is able to enlarge the preview image centering on Jane among a plurality of the characters included in the preview image. For another instance, the second mobile terminal 100 is able to enlarge the preview image centering on Ann among a plurality of the characters included in the preview image. For further instance, the third mobile terminal 100 is able to enlarge the preview image centering on Emily among a plurality of the characters included in the preview image.

Thus, each of the mobile terminals 100 is able to preview the preview image centering on the user currently wearing each of the mobile terminals 100. Hence, the user can watch the user's appearance in the preview image in detail through the mobile terminal 100 currently worn by the corresponding user.

In order to enlarge the preview image centering on the user currently wearing each of the mobile terminals 100, information (e.g., an image of a photographed face of a user currently wearing each of the mobile terminals 100, etc.) on the user currently wearing each of the mobile terminals 100 should be registered at each of the mobile terminals 100 in advance. Each of the mobile terminals 100 may be able to find a prescribed user from the preview image by the face matching between the previously registered image and the preview image.

While a prescribed one of a plurality of the characters is displayed by being enlarged, if an additional gesture is inputted, each of the mobile terminals 100 can control the preview image to be outputted centering on a face of a next (or previous) character by maintaining the enlarged state of the photo. For instance, if the second mobile terminal 100 is rotated in a first direction, the second mobile terminal 100 is able to control the preview image to be displayed by being enlarged centering on a face of Emily (located at a right side of Ann) located next to Ann. For another instance, if the second mobile terminal 100 is rotated in a second direction, the second mobile terminal 100 is able to control the preview image to be displayed by being enlarged centering on a face of Jane (located at a left side of Ann) located previous to Ann. Since the corresponding drawing can refer to FIG. 12, it will be omitted.

The mobile terminal 100 according to the present invention can be used to send a photo to another terminal or to receive a photo from another terminal. In particular, while a photo is displayed through the display unit 151, if a preset gesture is inputted, the controller 180 is able to send the currently displayed photo to another terminal. The mobile terminal 100 according to the present invention can communicate with another terminal by such a short range communication system as Bluetooth, Wi-Fi, Wi-Fi Direct, NAN or the like or such a mobile communication technology as LTE, HSPDA, HSPA+, CDMA or the like.

Another terminal may include a watch type terminal like the mobile terminal 100 according to the present invention, by which the present invention is non-limited. Yet, in the following description with reference to the accompanying drawing, assume that each of the mobile terminal 100 and the another terminal is a watch type. One example for the mobile terminal 100 to send a photo to another terminal is described in detail with reference to the accompanying drawing as follows.

Figure 17:
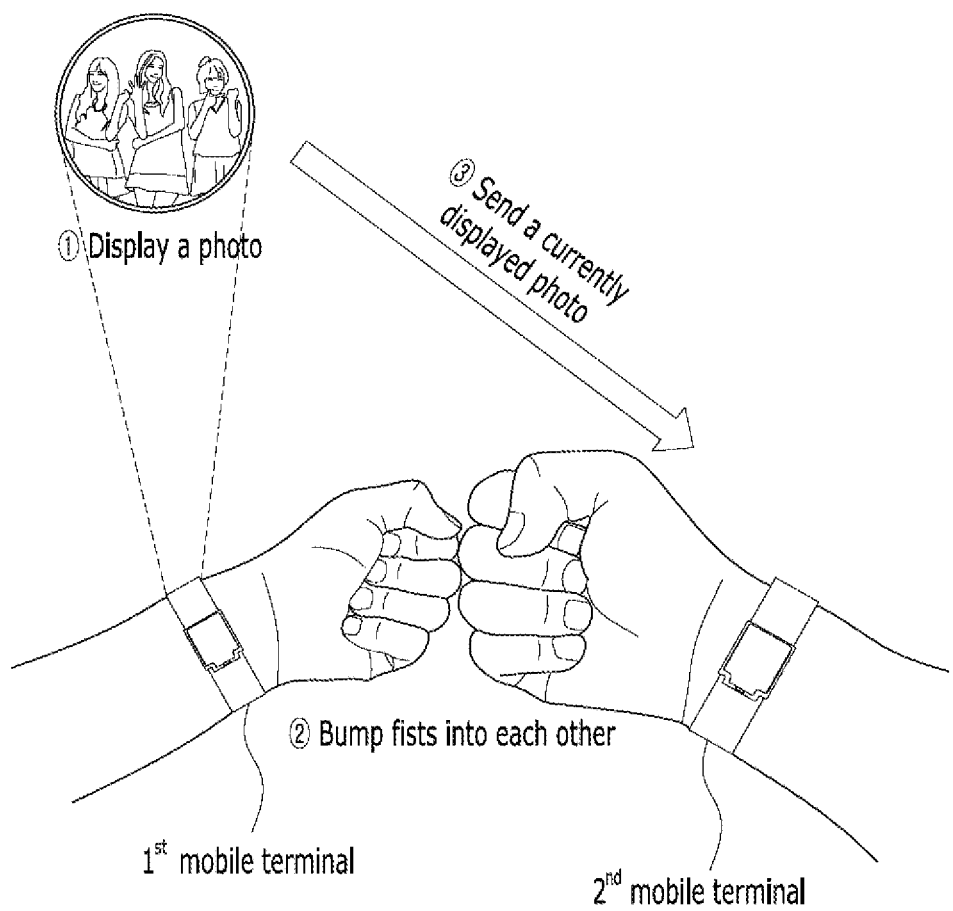
FIG. 17 is a diagram for one example of sending a photo to another terminal according to one embodiment of the present invention.

FIG. 17 is a diagram for one example of sending a photo to another terminal according to one embodiment of the present invention.

Referring to FIG. 17, if a photo is photographed through a photographing device, the mobile terminal 100 receives the photographed photo from the photographing device and is then able to output the received photo. The mobile terminal 100 receives a photo saved in the memory 170 of the photographing device and is then able to display the received photo as well as the photo received from the photographing device. And, the mobile terminal 100 is able to display a photo saved in the mobile terminal 100.

In response to a gesture input applied in the course of outputting the photo, the controller 180 can control a photo next (or previous) to the currently outputted photo to be outputted. For instance, if a wrist having the mobile terminal 100 worn thereon is rotated in a first direction, the controller 180 controls a photo next to a currently outputted photo to be outputted. For another instance, if a wrist having the mobile terminal 100 worn thereon is rotated in a second direction, the controller 180 controls a photo previous to a currently outputted photo to be outputted. The order of outputting the photos may be determined in accordance with a photographed sequence, a name sequence and/or the like.

While a photo is outputted through the display unit 151, if a preset gesture input is received, the controller 180 can send the currently outputted photo to another terminal with which a communication channel is established.

Like the example shown in FIG. 17, if a user currently wearing the mobile terminal takes a gesture of bumping his first against a first of another terminal user, the controller 180 can send the photo currently outputted through the display unit 151 to the another terminal user.

Yet, the gesture for sending a currently displayed photo is non-limited by the above-mentioned gesture.

While a photo of a photographed character is outputted, if a gesture is inputted, the controller 180 may be able to send a photo to the photographed character. For instance, while a photo of photographing a plurality of characters is outputted, if a preset gesture is inputted, the controller 180 can send the photo to the rest of the characters except a user currently wearing the mobile terminal among a plurality of the characters.

Figure 18:
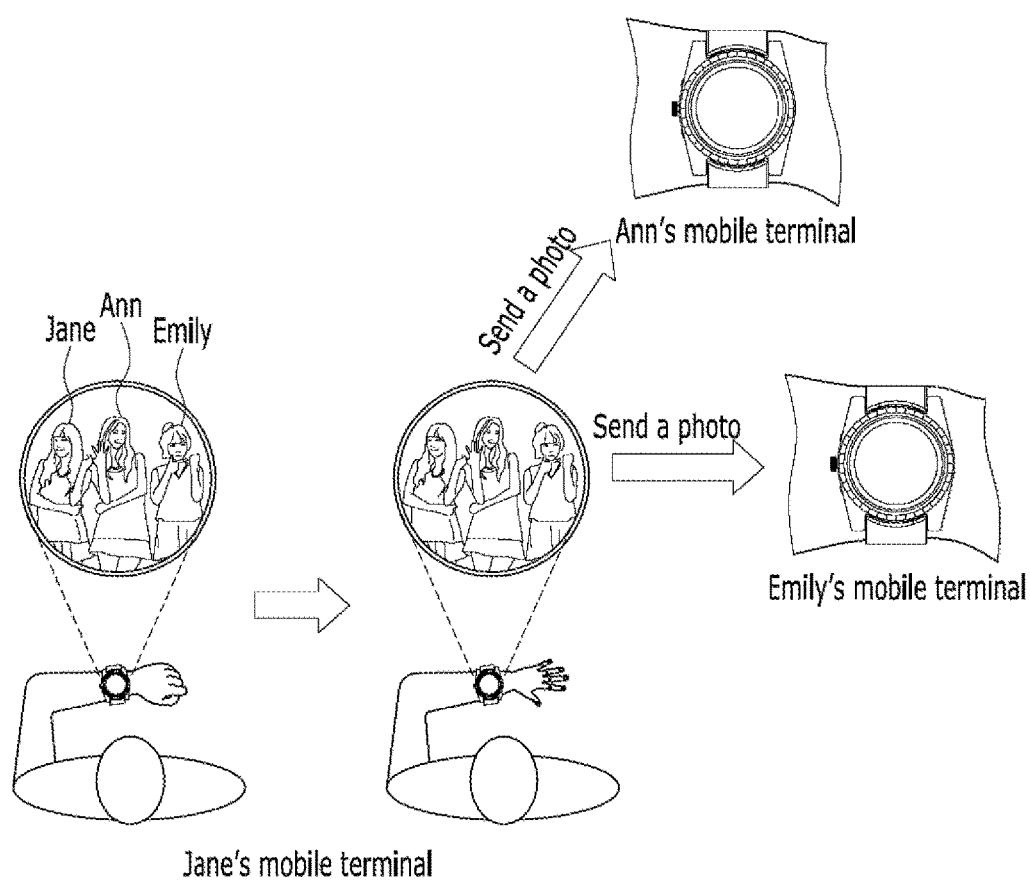
FIG. 18 is a diagram for one example of sending a photo to characters included in the photo according to one embodiment of the present invention.

For instance, FIG. 18 is a diagram for one example of sending a photo to characters included in the photo according to one embodiment of the present invention. For clarity of the following description, assume that the photographed characters in the photo include Jane, Ann and Emily. And, assume that the character currently wearing the mobile terminal 100 is Jane.

Referring to FIG. 18, while a photo of photographing Jane, Ann and Emily is displayed, if a preset gesture is inputted, the controller 180 can send the currently displayed photo to the mobile terminals 100 of Ann and Emily except the mobile terminal 100 of its own (i.e., the mobile terminal 100 of Jane).

According to the example shown in FIG. 18, as a gesture of unfolding all fingers of a mobile terminal worn side is inputted, the currently displayed photo is sent to the mobile terminals 100 of Ann and Emily.

For another instance, the controller 180 may be able to send a displayed photo to a prescribed one of a plurality of characters only.

Figure 19A:
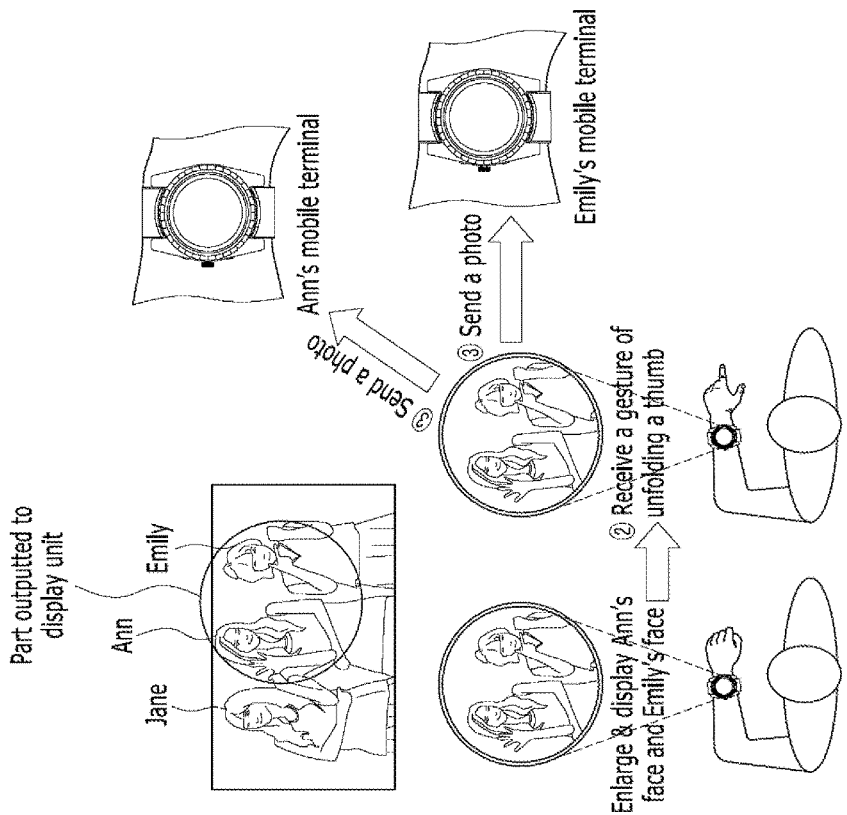
FIGS. 19A and 19B are diagrams for one example of sending a photo to some of characters included in the photo according to one embodiment of the present invention.
Figure 19B:
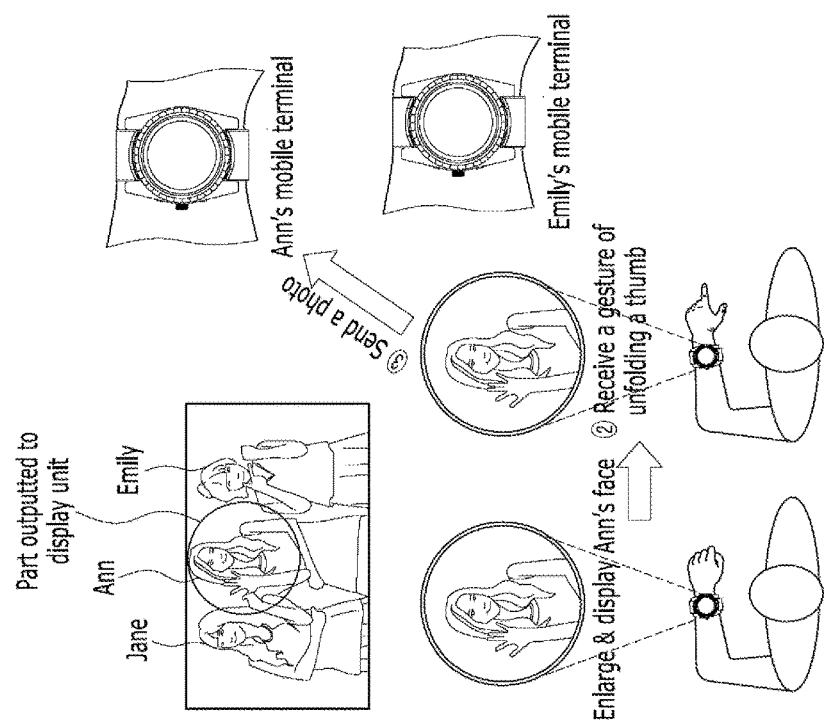

For instance, FIGS. 19A and 19B are diagrams for one example of sending a photo to some of characters included in the photo according to one embodiment of the present invention.

As mentioned in the foregoing descriptions with reference to FIGS. 11, 12A and 12B, a photo can be enlarged or reduced in response to a gesture input inputted while a photo of photographing a plurality of characters is displayed.

While a face of a prescribed one of a plurality of characters is displayed by being enlarged, if a preset gesture is inputted, the controller 180 can send a currently displayed photo to the mobile terminal 100 of the character currently displayed by being enlarged.

For instance, referring to FIG. 19A, while a face of Ann among a plurality of characters is displayed by being enlarged, if a gesture of unfolding a thumb of a mobile terminal worn side is inputted, the controller 180 can control the currently displayed photo to be sent to the mobile terminal 100 of Ann.

While faces of a plurality of characters are outputted through the display unit 151, if a gesture of unfolding an index finger of a mobile terminal worn side is inputted, the controller 180 can send the photo to the mobile terminals 100 of the characters currently outputted through the display unit 151.

For instance, referring to FIG. 19B, if a face of Emily among Jane, Ann and Emily is displayed on the display unit 151 only, the controller 180 can send a currently displayed photo to the mobile terminals 100 of Ann and Emily in response to a gesture of unfolding an index finger of a mobile terminal worn side.

In particular, like the examples shown in FIG. 19A and FIG. 19B, the controller 180 can send the photo to the mobile terminals 100 of the characters currently outputted through the display unit 151.

According to the example shown in FIG. 18, a gesture for sending a photo to every one of characters included in a photo is a gesture of unfolding all fingers. According to the example shown in FIGS. 19A and 19B, a gesture for sending a photo to some of characters included in a photo is a gesture of unfolding an index finger. Yet, a gesture for sending a photo is non-limited by the gestures shown in FIGS. 18, 19A and 19B. And, it is a matter of course that a photo can be sent to characters included in a photo by a gesture different from those shown in the drawing.

Accordingly, embodiments of the present invention provide various effects and/or features.

First of all, the present invention can provide a mobile terminal and controlling method thereof, by which user's convenience can be enhanced.

In particular, the present invention can provide a watch type mobile terminal and controlling method thereof, by which a photographing device can be controlled remotely.

Moreover, the present invention can a watch type mobile terminal and controlling method thereof, by which a photo photographed through a photographing device can be shared with another terminal.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A watch type mobile terminal wearable on a wrist, the mobile terminal comprising:
    a wireless communication unit configured to communicate with a photographing device;
    a sensing unit configured to sense a user's gestures;
    a display; and
    a controller configured to:
        cause the display to display a preview image received via a camera of the photographing device;
        cause the wireless communication unit to transmit a command to the photographing device in response to a user input received while the preview image is displayed, wherein the user input includes a gesture of clenching an open hand of the wrist on which the mobile terminal is worn, the transmitted command causing the photographing device to capture a photo according to the preview image;
        set a photographing standby time based on a number of times the mobile terminal is swayed according to movement of the user's wrist with the clenched hand; and
        cause the wireless communication unit to transmit information relating to the set photographing standby time to the photographing device in response to a gesture of opening the clenched hand such that the photo is captured by the photographing device when the photographic standby time lapses after the photographing device receives the command and the information.

2. The mobile terminal of claim 1, wherein when the photographing device is in a portrait mode orientation, the controller is further configured to cause the display to display the preview image in a manner of adapting a first width of the preview image to a second width of the display such that the first width is equal to or less than the second width.

3. The mobile terminal of claim 1, wherein when the photographing device is in a landscape mode orientation, the controller is further configured to cause the display to display the preview image in a manner of adapting a first height of the preview image to a second height of the display such that the first height is equal to or less than the second height.

4. The mobile terminal of claim 1, wherein the controller is further configured to cause the display to display the captured photo received from the photographing device.

5. The mobile terminal of claim 4, wherein the controller is further configured to enlarge or reduce the photo displayed on the display based on a user input received while the photo is displayed.

6. The mobile terminal of claim 5, wherein when the photo includes a person, the controller is further configured to cause the displayed photo to be enlarged centering on the person included in the photo.

7. The mobile terminal of claim 4, wherein when the photo includes a plurality of persons, the controller is further configured to cause the displayed photo to be enlarged centering on one of the plurality of persons wearing the mobile terminal.

8. The mobile terminal of claim 4, wherein the controller is further configured to cause the wireless communication unit to transmit a command for deleting or saving the photo to the photographing device in response to a user input received while the photo is displayed on the display.

9. The mobile terminal of claim 4, wherein the controller is further configured to cause the wireless communication unit to transmit the photo to another terminal in response to a user input received while the photo is displayed on the display.

10. The mobile terminal of claim 9, wherein when the photo includes a person, the controller is further configured to cause the wireless communication unit to transmit the photo to a terminal of the person included in the photo.

11. The mobile terminal of claim 9, wherein when the photo includes a plurality of persons, the controller is further configured to:
    cause the display to display an enlarged portion of the photo, the enlarged portion including at least one of the plurality of persons; and
    cause the wireless communication unit to transmit the photo to at least one terminal that corresponds to the at least one of the plurality of persons.

12. A method of controlling a watch type mobile terminal wearable on a user's wrist, the method comprising:
    wirelessly receiving preview image data from an external photographing device with a camera;
    displaying a preview image based on the received preview image data;
    transmitting a command to the photographing device in response to a user input received while the preview image is displayed, wherein the user input includes a gesture of clenching an open hand of the wrist on which the mobile terminal is worn, the transmitted command causing the photographing device to capture a photo according to the preview image;
    setting a photographing standby time based on a number of times the mobile terminal is swayed according to movement of the user's wrist with the clenched hand; and
    transmitting information relating to the set photographing standby time to the photographing device in response to a gesture of opening the clenched hand such that the photo is captured by the photographing device when the photographic standby time lapses after the photographing device receives the command and the information.

13. The method of claim 12, further comprising:
    displaying the captured photo received from the photographing device.

14. The method of claim 13, wherein when the photo includes a plurality of persons including the user, the method further comprises enlarging the displayed photo centering on the user wearing the mobile terminal.

* * * * *